(12) United States Patent
Kitada et al.

(10) Patent No.: US 9,151,982 B2
(45) Date of Patent: *Oct. 6, 2015

(54) MANUFACTURING SYSTEM AND MANUFACTURING METHOD FOR OPTICAL DISPLAY DEVICE

(75) Inventors: Kazuo Kitada, Ibaraki (JP); Tomokazu Yura, Ibaraki (JP); Satoru Koshio, Ibaraki (JP); Takuya Nakazono, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 188 days.

This patent is subject to a terminal disclaimer.

(21) Appl. No.: 13/439,427

(22) Filed: Apr. 4, 2012

(65) Prior Publication Data

US 2012/0193034 A1 Aug. 2, 2012

Related U.S. Application Data

(62) Division of application No. 13/056,003, filed as application No. PCT/JP2010/057906 on May 10, 2010, now Pat. No. 8,398,805.

(30) Foreign Application Priority Data

| May 21, 2009 | (JP) | 2009-122784 |
| May 7, 2010 | (JP) | 2010-107023 |

(51) Int. Cl.
*G02F 1/1335* (2006.01)
*G02F 1/13* (2006.01)
(Continued)

(52) U.S. Cl.
CPC ........ *G02F 1/133528* (2013.01); *G02F 1/1303* (2013.01); *G02F 1/1333* (2013.01);
(Continued)

(58) Field of Classification Search
CPC ............ G02F 1/133528; G02F 1/1303; G02F 1/1333; Y10T 156/12; Y10T 156/125; Y10T 156/1052; Y10T 156/1056; Y10T 156/1057; Y10T 156/1062; Y10T 156/1084; Y10T 156/1087

USPC ......... 156/250, 252, 253, 256, 269, 271, 510, 156/516, 517, 521

See application file for complete search history.

(56) References Cited

U.S. PATENT DOCUMENTS 6,981,580 B2 * 1/2006 Meyer .......................... 198/415
7,980,285 B2 * 7/2011 Kitada et al. .................. 156/511
(Continued)

FOREIGN PATENT DOCUMENTS

| JP | 57-52017 A | 3/1982 |
| JP | 2005-037417 A | 2/2005 |

(Continued)

OTHER PUBLICATIONS

Extended European Search Report dated Oct. 1, 2012, issued in corresponding European Patent Application No. 10777675.9 (10 pages).

(Continued)

*Primary Examiner* — Philip Tucker
*Assistant Examiner* — Christopher C Caillouet
(74) *Attorney, Agent, or Firm* — Westerman, Hattori, Daniels & Adrian, LLP

(57) ABSTRACT

A manufacturing system is provided with a supplying apparatus of a first sheet material supplying after cutting into a predetermined length, and a supplying apparatus of a second sheet material supplying after cutting into a predetermined length, and the supplying apparatus of the first sheet material and the supplying apparatus of the second sheet material are structured such that one supplying apparatus cuts a long sheet material having a width corresponding to a short side into a length corresponding to a long side, and the other supplying apparatus cuts a long sheet material having a width corresponding to the long side into a length corresponding to the short side, in correspondence to the long side and the short side of the optical display unit.

7 Claims, 10 Drawing Sheets

(51) Int. Cl.
*G02F 1/1333* (2006.01)
*G02B 1/10* (2015.01)
*G02B 5/30* (2006.01)

(52) U.S. Cl.
CPC .............. *G02B 1/105* (2013.01); *G02B 5/3025* (2013.01); *Y10T 156/1052* (2015.01); *Y10T 156/1056* (2015.01); *Y10T 156/1057* (2015.01); *Y10T 156/1062* (2015.01); *Y10T 156/1084* (2015.01); *Y10T 156/1087* (2015.01); *Y10T 156/12* (2015.01); *Y10T 156/125* (2015.01)

(56) References Cited

U.S. PATENT DOCUMENTS

| | | | |
|---|---|---|---|
| 8,187,048 B2* | 5/2012 | Kitada et al. | 445/25 |
| 2005/0016670 A1 | 1/2005 | Kanbara et al. | |
| 2006/0124248 A1 | 6/2006 | Kanbara et al. | |
| 2008/0074585 A1 | 3/2008 | Yoshimi | |
| 2008/0088790 A1* | 4/2008 | Ohashi | 349/192 |
| 2009/0159175 A1 | 6/2009 | Nakahira et al. | |
| 2009/0218049 A1 | 9/2009 | Kanbara et al. | |
| 2009/0260738 A1 | 10/2009 | Kitada et al. | |
| 2009/0263608 A1* | 10/2009 | Kitada et al. | 428/41.8 |

FOREIGN PATENT DOCUMENTS

| | | |
|---|---|---|
| JP | 2007-078978 A | 3/2007 |
| JP | 2007-140046 A | 6/2007 |
| JP | 2008-102471 A | 5/2008 |
| JP | 2010-231213 A | 10/2010 |
| KR | 10-2004-0002796 A | 1/2004 |

OTHER PUBLICATIONS

International Search Report of PCT/JP2010/057906, mailed Jun. 22, 2010.

Japanese Office Action dated Oct. 26, 2010, issued in corresponding Japanese Patent Application No. 2010-107023.

Korean Office Action dated Apr. 21, 2011, issued in corresponding Korean Patent Application No. 10-2011-7000906.

Notification of Transmittal of Translation of the International Preliminary Report on Patentability (Form PCT/IB/338) of International Application No. PCT/JP2010/057906 mailed Dec. 22, 2011 with Forms PCT/IB/373 and PCT/ISA/237.

Chinese Office Action dated Feb. 28, 2013, issued in corresponding Chinese Patent Application No. 201080002191.5, w/ English translation.

Office Action dated Dec. 16, 2013, issued in corresponding European application No. 10777675.9.

Chinese Search Report dated Jul. 27, 2014, issued in corresponding Chinese Application No. 201210420848.0; w/ English Translation. (4 pages).

* cited by examiner (a)

(b)

MANUFACTURING SYSTEM AND MANUFACTURING METHOD FOR OPTICAL DISPLAY DEVICE

CROSS-REFERENCE OF RELATED APPLICATIONS

This application is a Divisional of application Ser. No. 13/056,003, filed Jan. 26, 2011, which is a 371 of International Application No. PCT/JP2010/057906, filed May 10, 2010 and claims priority of Japanese Patent Application 2009-122784 and 2010-107023, the contents of which are incorporated herein by reference.

TECHNICAL FIELD

The invention relates to a system and a method for manufacturing an optical display device, which is for use in bonding optically-anisotropic optical films, such as polarizing plate-containing optical films, to one and the other surfaces of a rectangular optical display unit, and to a set of material rolls and a manufacturing method thereof.

BACKGROUND ART

A production method of an optical display device mounted to a conventional liquid crystal display device is conceptually shown in FIG. 11. First, in an optical filmmaker, a step produces a long (web-like) sheet material having an optical film as a material roll (#1). The concrete production step is a known production step, and a description thereof will not be given. As the "long (web-like) sheet material", for example, there are a polarizing plate material, a retardation plate material, a laminated film material of the polarizing plate and the retardation plate, and the like which are used in a liquid crystal display device. Next, the material roll is slit to a predetermined size (a size in accordance with a size of the optical display unit) (#2). Next, the slit long material is cut to a fixed size in conformity to a size of the optical display unit (#3). Next, a step inspects an outer appearance of a piece of sheet material (an optical film) cut to the fixed size (#4). As the inspecting method, for example, there can be listed up a defect inspection in accordance with a visual observation, and an inspection using a known defect inspection apparatus. The defect means, for example, a dirty in a front face or an internal portion, a scratch, a special twisted defect like a hitting mark generated by biting a contaminant (which may be called as a knick), an air bubble, a contaminant or the like. Next, a step inspects a finished product (#5). The finished product inspection is an inspection in accordance with a quality standard having a severer non-defective determination than the outer appearance inspection. Next, a step works end faces in four sides of the sheet material of the piece of sheet material (#6). This step is carried out for preventing an adhesive or the like from running over from the end faces during transport. Next, a step cleanly packages the piece of sheet material under a clean room environment (#7). Next, a step packages for transport (a transport package) (#8). The piece of sheet material is produced as mentioned above, and is transported to a panel processing manufacturer.

In the panel processing manufacturer, a step dismounts the package of the piece of sheet material transported (#11). Next, a step inspects an outer appearance for inspecting the scratch, the dirt and the like generated at a time of transporting or dismounting the package (#12). The piece of sheet material which is determined as the non-defective by the inspection is fed to the next step. There is a case that the outer appearance inspection is omitted. An optical display unit (for example, a glass substrate unit in which a liquid crystal cell is enclosed) to which the piece of sheet material is bonded is previously produced, and the optical display unit is cleaned before the bonding step (#13).

A step bonds the piece of sheet material and the optical display unit (#14). A release film is peeled off from the piece of sheet material while leaving a pressure-sensitive adhesive layer, and it is bonded to one face of the optical display unit by using the pressure-sensitive adhesive layer as a bonding face. Further, it can be bonded to the other face of the optical display unit in the same manner. In the case of bonding to both the faces, the structure may be made such that the optical films having the same construction are bonded to the faces of the optical display unit, or the structure may be made such that the optical films having different constructions are bonded thereto. Next, a step carries out an inspection of the optical display device in the state in which the optical film is bonded and a defect inspection (#15). The optical display device which is determined as the non-defective in this inspection is fed to a mounting process (#16). On the other hand, a reworking process is applied to the optical display device which is determined as a defective (#17). In the reworking process, the optical film is peeled off from the optical display unit. The optical film is newly bonded to the reworked optical display unit (#14).

In the production step mentioned above, since the optical film maker and the panel processing manufacturer exist in the separate places, the end face working, the packaging of the piece of sheet material, the package dismounting and the like are particularly necessary steps. However, there are a problem of a production cost increase caused by multiple steps, a problem of the scratch, the dust, the dirt and the like generated by the multiple steps and the transport, a necessity of the inspection step caused thereby, and a problem that it is necessary to store and manage many kinds of sheet materials as a stock.

As a method of solving the problems, there has been proposed Japanese Patent Application Laid-Open (JP-A) No. 2007-140046. In accordance with this invention, the structure is provided with a supply portion pulling out and supplying a long sheet material from a material roll around which the long sheet material having an optical film corresponding to a member of an optical display device is wound, a detection portion detecting a defect of the long sheet material pulled out by the supply portion, a cutting work portion cutting the long sheet material based on a result of detection of the detection portion and working to an individual sheet material, a transfer portion transferring the sheet material cut by the cutting work portion for a bonding work, and a bonding work portion bonding the sheet material transferred by the transfer portion and an optical display unit corresponding to a member of an optical display device, and these portion are arranged on a continuous production line. In the structure mentioned above, it is possible to directly cut the long sheet material having the optical film into a desired size, and to bond the cut sheet material to the optical display unit. Accordingly, it is possible to directly package the long sheet material wound around the material roll so as to deliver, in place of the conventional step which stamps the long sheet material, tightly packages the stamped sheet material, and delivers to the panel processing manufacturer.

PRIOR ART DOCUMENT

Patent Document

Patent Document 1: Japanese Unexamined Patent Publication No. 2007-140046

SUMMARY OF THE INVENTION

Problems to be Solved by the Invention

However, in the manufacturing system for the optical display device in Patent Document 1, there is not disclosed a structure which is independently provided with an apparatus at a time of bonding the optical film to one side surface of the optical display unit and thereafter bonding the optical film to the other side surface. Accordingly, in the case of bonding the optical film to the other side surface by using the same manufacturing system, there is room for improvement of a manufacturing efficiency such as a double labor work at a time of loading the optical display unit after being bonded to the device.

Further, in the polarizing plate bonded to the upper and lower sides of the optical display unit, the directions of the absorption axes are different in upper and lower sides (intersect vertically), and it is generally hard to manufacture the material roll having the absorption axis in the roll width direction. On the other hand, the normal optical display unit has a rectangular shape. Taking these into consideration, the device structure is not said to be sufficient only by adding each of the means from the feeding means to the bonding process means of the long sheet material to the manufacturing system of Patent Document 1.

Further, not limiting to the case that the polarizing plates are laminated up and down, for example, in the case that the retardation plates are laminated to a up and down surface of the optical display unit, there is a case that it is necessary to make the directions of the slow shafts orthogonal in each of the upper and lower sides, and the same problem as the case of laminating the polarizing plates is generated in this case.

It is therefore an object of the invention to provide a system and a method for manufacturing an optical display device, in which optical films can be bonded to one and the other surfaces of an optical display unit in such a manner that the optical anisotropy of the one is orthogonal to that of the other by using two material rolls that are the same in the direction of optical anisotropy, such as the direction of absorption axis, and to provide a set of material rolls and a manufacturing method thereof.

Means for Solving the Problems

The object mentioned above can be achieved by the present invention as described below. A manufacturing system for an optical display device according to the present invention relates to a manufacturing system of an optical display device comprising a rectangular optical display unit, a first optical film with optical anisotropy bonded to one surface of the optical display unit, and a second optical film with optical anisotropy bonded to the other surface of the optical display unit, the manufacturing system comprising:

a first cutting and bonding apparatus for cutting a first long sheet material, which has a first optical film with a width corresponding to a short side of the optical display unit and is drawn from a first material roll of the first sheet material wound, into a length corresponding to a long side of the optical display unit, and thereafter bonding at least a first optical film in the pieces of cut first sheet materials to one surface of the optical display unit; and a second cutting and bonding apparatus for cutting a second long sheet material, which has a second optical film with a width corresponding to a long side of the optical display unit and is drawn from a second material roll of the second sheet material wound, into a length corresponding to a short side of the optical display unit, and thereafter bonding at least a second optical film in the pieces of cut second sheet materials to the other surface of the optical display unit.

In the optical display device manufacturing system of the invention, pieces of optical films with sizes corresponding to the short and long sides of the optical display unit can be obtained, respectively, only by cutting the optical film in use of a material roll with a width corresponding to the short side of the optical display unit and a material roll with a corresponding to the long side of the optical display unit. Accordingly, it is possible to bond the optical films to one surface and the other surface of the optical display unit in such a manner that the optical anisotropies are orthogonal, while using two roll materials in which the optical anisotropies are the same direction such as the absorption axes, by cutting the former into the length corresponding to the long side, cutting the latter into the length corresponding to the short side, and bonding at least the optical film in the respective pieces of sheet materials, to both the surfaces of the optical display unit.

The manufacturing system can further comprise a feeder for transporting and feeding the optical display unit from any one cutting and bonding apparatus of the first cutting and bonding apparatus and the second cutting and bonding apparatus to the other cutting and bonding apparatus.

In this case, the feeder can include a turning mechanism for turning the optical display unit from a bonding direction of any one cutting and bonding apparatus of the first cutting and bonding apparatus and the second cutting and bonding apparatus to a bonding direction of the other cutting and bonding apparatus.

The presence of such a turning mechanism makes it unnecessary to vertically arrange a set of the first optical film feeding apparatus and the first bonding apparatus and a set of the second optical film feeding apparatus and the second bonding apparatus, which makes it possible to save the space of the manufacturing system. The turning mechanism also makes it possible to set a proper bonding angle for the second bonding apparatus. Specifically, higher turning position accuracy can be obtained when the optical display unit, which is harder than the optical film, is turned than when the flexible material such as the optical film is turned.

The feeder can include a turning-over mechanism for turning over the optical display unit. With the structure mentioned above, it is possible to bond the first optical film and the second optical film in a crossed nicols relation by bonding both the first optical film and the second optical film from one side of the upper side and the lower side with respect to the optical display unit.

The first cutting and bonding apparatus, the feeder and the second cutting and bonding apparatus can be arranged linearly. With the structure mentioned above, it is possible to achieve a space saving of the manufacturing system.

The first cutting and bonding apparatus and the second cutting and bonding apparatus can have cutting means for cutting the long sheet material by horizontally moving in a width direction of the long sheet material. With the structure mentioned above, since the end surface of the cut sheet material becomes smoother in comparison with the conventional cutting method of pressing the cutting tool, the end surface work is not necessary.

The cutting means may include a laser beam or a cutting tool (preferably a round blade). With the structure mentioned above, it is possible to make the end surface of the cut sheet material smoother.

Each of the first cutting and bonding apparatus and the second cutting and bonding apparatus can have a rejection mechanism cutting and rejecting a portion having a defect in the long sheet material. It is possible to reject the defect portion of the long sheet material with the rejection mechanism, and to improve a yield ratio of the sheet material.

The first cutting and bonding apparatus can have a first reserving mechanism for sequentially reserving the pieces of first sheet materials until the first cutting and bonding apparatus cuts the pieces of first sheet materials from the first long sheet material and bonds it to the optical display unit. In the first cutting and bonding apparatus, in the case that the cutting speed of the cutting means is higher than the bonding speed of the bonding means, the excess first sheet materials may be manufactured. In the case mentioned above, since the first cutting and bonding apparatus has the first reserving mechanism, it is possible to regulate the supply amount of the first sheet material to be supplied to the bonding means.

The second cutting and bonding apparatus can have a second reserving mechanism for sequentially reserving the pieces of second sheet materials until the second cutting and bonding apparatus cuts the pieces of second sheet materials from the second long sheet material and bonds it to the optical display unit. In the second cutting and bonding apparatus, in the case that the cutting speed of the cutting means is higher than the bonding speed of the bonding means, the excess second sheet materials may be manufactured. In the case mentioned above, since the second cutting and bonding apparatus has the second reserving mechanism, it is possible to regulate the supply amount of the second sheet material to be supplied to the bonding means.

On the other hand, a manufacturing method of an optical display device according to the present invention relates to a manufacturing method of an optical display device comprising a rectangular optical display unit, a first optical film with optical anisotropy bonded to one surface of the optical display unit, and a second optical film with optical anisotropy bonded to the other surface of the optical display unit, the manufacturing method comprising:

a first cutting and bonding step of drawing a first long sheet material having a first optical film of a width corresponding to a short side of the optical display unit from a first material roll around which the first long sheet material is wound, cutting the first long sheet material into a length corresponding to a long side of the optical display unit, and thereafter bonding at least the first optical film in the cut pieces of first sheet materials to one surface of the optical display unit; and a second cutting and bonding step of drawing a second long sheet material having a second optical film of a width corresponding to the long side of the optical display unit from a material roll around which the second long sheet material is wound, cutting the second long sheet material to the length corresponding to the short side of the optical display unit, and thereafter bonding at least the second optical film in the cut pieces of second sheet materials to the other surface of the optical display unit.

According to the manufacturing method for the optical display device of the present invention, by using the roll material having the width corresponding to the short side of the optical display unit, and the roll material having the width corresponding to the long side, the former is cut into the length corresponding to the long side, the latter is cut into the length corresponding to the short side, and at least the optical film in the respective pieces of sheet materials is bonded to both the surfaces of the optical display unit. Accordingly, it is possible to bond the optical films to one surface and the other surface of the optical display unit in such a manner that the optical anisotropies are orthogonal, while using two roll materials in which the optical anisotropies are the same direction such as the absorption axes.

The manufacturing method can further comprise a transporting and feeding step of transporting and feeding the optical display unit from any one cutting and bonding step of the first cutting and bonding step and the second cutting and bonding step to the other cutting and bonding step.

In this case, the transporting and feeding step can include a turning step of turning the optical display unit from a bonding direction of any one cutting and bonding step of the first cutting and bonding step and the second cutting and bonding step to a bonding direction of the other cutting and bonding step. Such a turning step makes it unnecessary to vertically arrange the first and second sheet material feed directions, which makes it possible to save the space of the manufacturing system. The use of the turning step also makes it possible to set a proper bonding angle for the second bonding apparatus.

The transporting and feeding step can include a turning-over step of turning over the optical display unit. With the structure mentioned above, it is possible to bond the first optical film and the second optical film in a crossed nicols relation by bonding both the first optical film and the second optical film from one side of the upper side and the lower side with respect to the optical display unit.

The first cutting and bonding step and the second cutting and bonding step can include a cutting step of cutting the long sheet material by horizontally moving cutting means in a width direction of the long sheet material. With the structure mentioned above, since the end surface of the cut sheet material becomes smoother in comparison with the conventional cutting method of pressing the cutting tool, the end surface work is not necessary.

The cutting means may include a laser beam or a cutting tool (preferably a round blade). With the structure mentioned above, it is possible to make the end surface of the cut sheet material smoother.

Each of the first cutting and bonding step and the second cutting and bonding step can has a rejection step of cutting and rejecting a portion having a defect in the long sheet material. It is possible to reject the defect portion of the long sheet material by the rejection step mentioned above, and to improve a yield ratio of the sheet material.

The first cutting and bonding step can have a first reserving step of sequentially reserving the pieces of first sheet materials until the pieces of first sheet materials are cut from the first long sheet material and bonded to the optical display unit. In the first cutting and bonding step, in the case that the cutting speed of the cutting means is higher than the bonding speed of the bonding means, the excess first sheet materials may be manufactured. In the case mentioned above, since the first cutting and bonding step has the first reserving step, it is possible to regulate the supply amount of the first sheet material to be supplied to the bonding means.

The second cutting and bonding step can have a second reserving step of sequentially reserving the pieces of second sheet materials until the pieces of second sheet materials are cut from the second long sheet material and bonded to the optical display unit. In the second cutting and bonding step, in the case that the cutting speed of the cutting means is higher than the bonding speed of the bonding means, the excess second sheet materials may be manufactured. In the case mentioned above, since the second cutting and bonding step has the second reserving step, it is possible to regulate the supply amount of the second sheet material to be supplied to the bonding means.

A manufacturing system for an optical display device according to the present invention relates to a manufacturing system of an optical display device comprising a rectangular optical display unit and an optical film having a polarizing plate bonded to a surface of the optical display unit, the manufacturing system comprising:

a cutting and bonding apparatus for cutting a long sheet material, which is drawn from a material roll of the long sheet material wound after slitting a long material in parallel to the longitudinal direction at a width corresponding to a short or long side of the optical display unit, in which the long material has a longitudinal direction parallel to an absorption axis of the polarizing plate, into a length corresponding to a long or short side of the optical display unit, and thereafter bonding at least a first optical film in the pieces of cut sheet materials to a surface of the optical display unit.

According to the manufacturing system for the optical display device of the present invention, it is possible to obtain the pieces of sheet materials corresponding to the short side and the long side of the optical display unit only by cutting the long sheet material supplied from the roll material into the length corresponding to the long side or the short side of the optical display unit, by using the roll material having the width corresponding to the short side or the long side of the optical display unit, whereby it is possible to bond at least the optical film in the obtained pieces of sheet materials, to the surface of the optical display unit.

A manufacturing method of an optical display device according to the present invention relates to a manufacturing method of an optical display device comprising a rectangular optical display unit and an optical film having a polarizing plate bonded to a surface of the optical display unit, the manufacturing method comprising:

a cutting and bonding step of cutting a long sheet material, which is drawn from a material roll of the long sheet material wound after slitting a long material in parallel to the longitudinal direction at a width corresponding to a short or long side of the optical display unit, in which the long material has a longitudinal direction parallel to an absorption axis of the polarizing plate, into a length corresponding to a long or short side of the optical display unit, and thereafter bonding at least a first optical film in the pieces of cut sheet materials to a surface of the optical display unit.

According to the manufacturing method for the optical display device of the present invention, it is possible to obtain the pieces of sheet materials corresponding to the short side and the long side of the optical display unit only by cutting the long sheet material supplied from the roll material into the length corresponding to the long side or the short side of the optical display unit, by using the roll material having the width corresponding to the short side or the long side of the optical display unit, whereby it is possible to bond at least the optical film in the obtained pieces of sheet materials, to the surface of the optical display unit.

MODES FOR CARRYING OUT THE INVENTION

Figure 1:
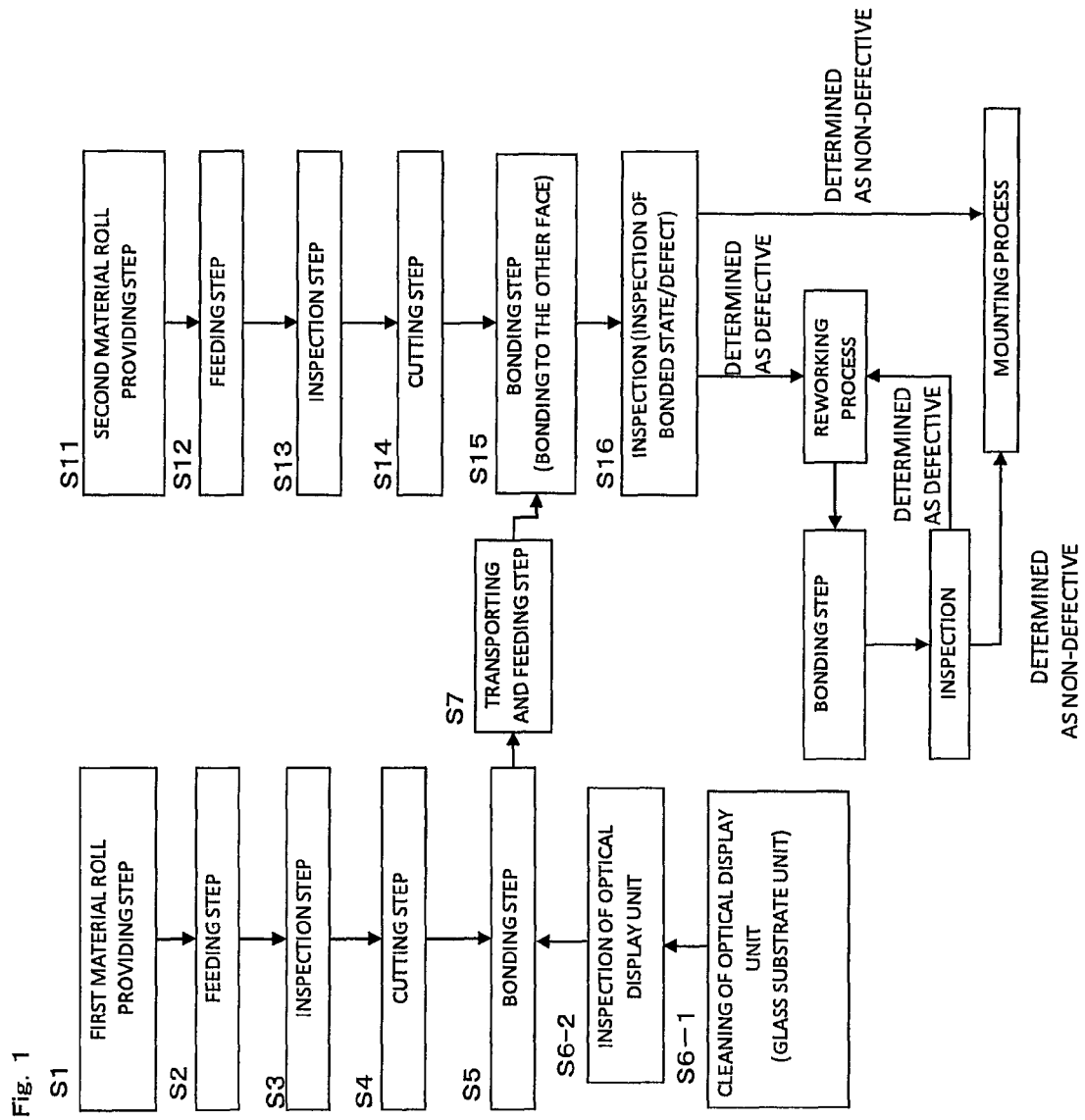
FIG. 1 is a flow chart showing a process performed using the manufacturing system of the invention.
Figure 2:
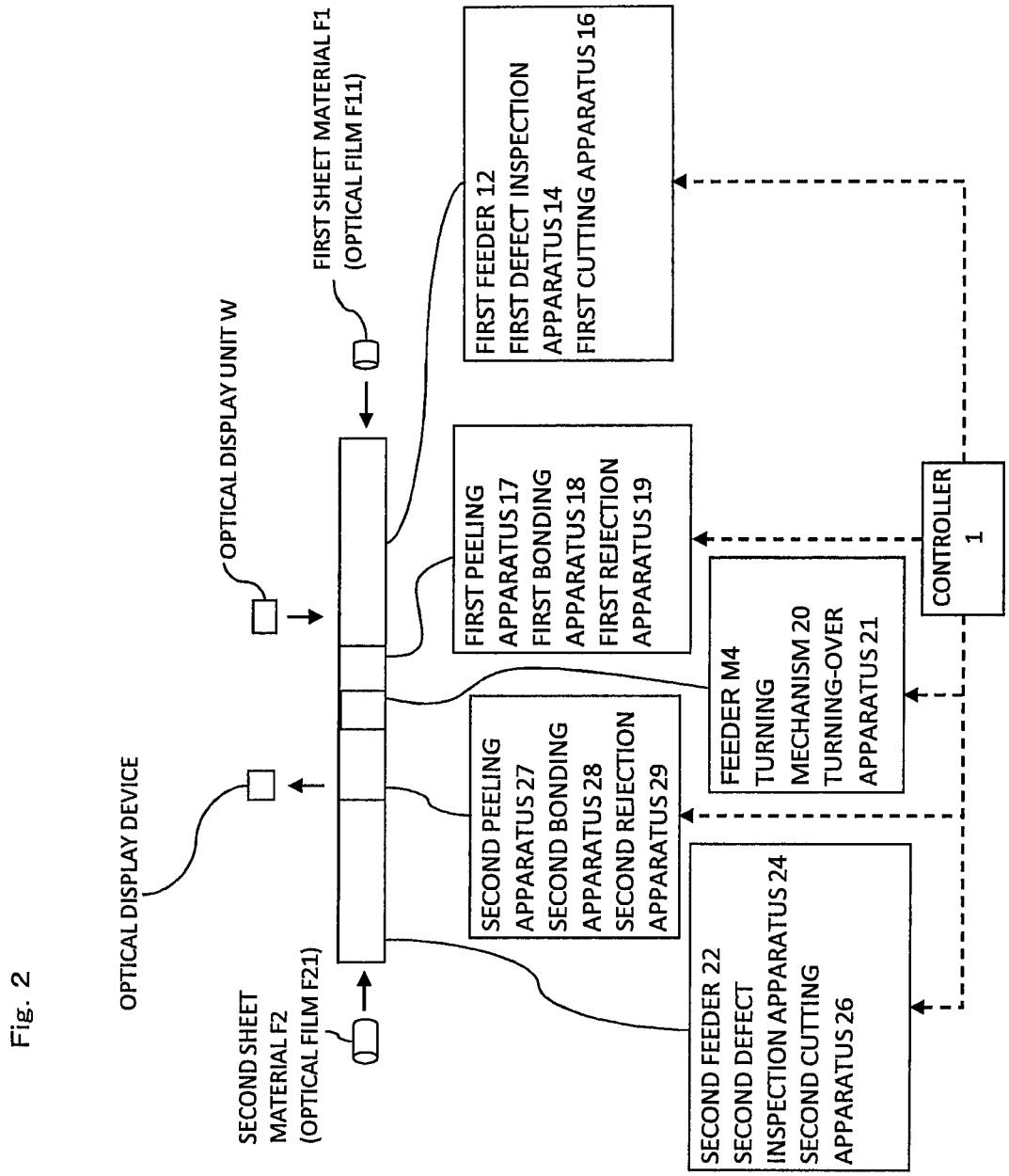
FIG. 2 is a diagram for illustrating an example of the manufacturing system of the invention.
Figure 3A:
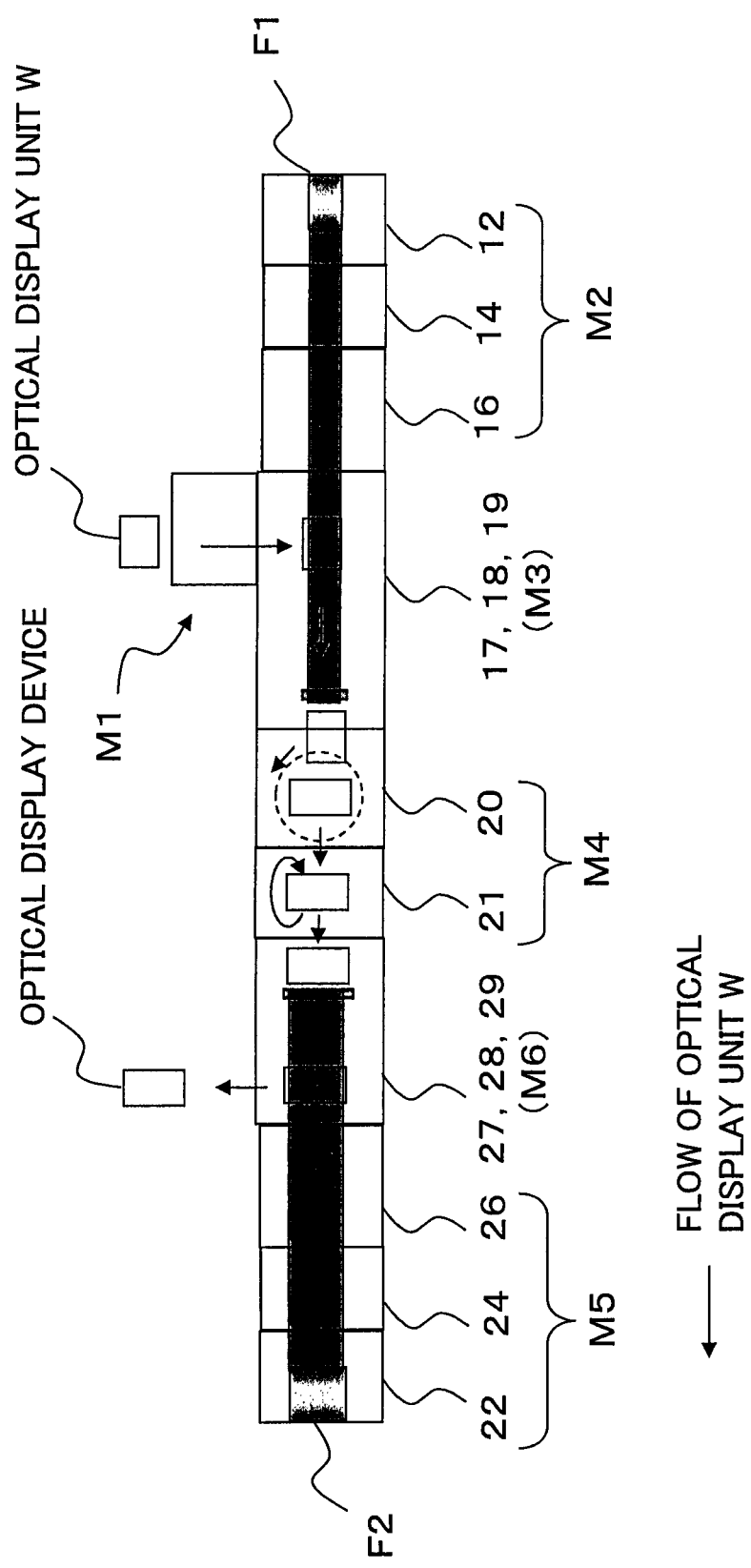
FIG. 3A is a diagram for illustrating an example of the manufacturing system of the invention.

A description will be given below of an embodiment in accordance with the present invention in the order of a raw material used in a manufacturing system for an optical display device, a flow of a manufacturing step, and s structure of each of portions of the manufacturing system. FIG. 1 shows an example of a flow chart of a manufacturing method for the optical display device. FIG. 2 shows a block diagram of an embodiment of a manufacturing system for the optical display device. FIG. 3A shows a plan arrangement view of an embodiment of a manufacturing system for the optical display device.

(Optical Display Unit)

The optical display unit for use in the invention is intended to include any assembly of parts for displaying characters or images. The optical display unit is typically a liquid crystal cell, an organic electroluminescence panel, or the like. The invention is effective when using an optical display unit having a rectangular outline shape, such as that with a long side/short side ratio of 16/9 or 4/3. The optical display unit may also have such a member as an optical film that is previously integrated as part of the laminated structure.

(Optical Film)

The optical film to be bonded to the optical display unit may be a monolayer film or a multilayer film. The optical film has at least one optically anisotropic layer. The term "optically anisotropic" or "optical anisotropy" means that the in-plane optical properties are not uniform, and examples of optical anisotropy include absorption anisotropy, refractive index anisotropy, and reflection anisotropy. The optical film is typically a polarizing plate having an absorption axis, a retardation film having a slow axis, a brightness enhancement film having a transmission axis, or a laminate thereof.

The polarizing plate-containing optical film may be a polarizing plate or an optical film including a laminate of a polarizing plate and a retardation film, a brightness enhancement film, or a combination of two or more of these films.

The long sheet material for use in the invention is intended to include a long sheet that is processed to have a width corresponding to the short or long side of the optical display unit and is sufficiently longer in the longitudinal direction than in the width direction. For example, the length of the long sheet material is 10 times or more the width. The long sheet material may be any material containing the optical film. The long sheet material preferably includes a polarizing plate-containing optical film, a pressure-sensitive adhesive layer, and a release film, which are provided in this order.

The material roll for use in the invention is a wound roll of the long sheet material. The material roll is usually obtained by winding the long sheet material around a roll core from one end thereof.

There is a case that a transparent film for protection is laminated on a surface of the optical film. Further, it is preferable that an adhesive layer is formed on one surface of the optical film, for example, in such a manner as to be bonded to the optical display unit, and a release film for protecting the adhesive layer is provided. Further, a surface protecting film is provided on the other surface of the optical film, for example, via a pressure-sensitive adhesive layer.

The present invention is effective in the case of using two material rolls in which the optical anisotropies are the same direction, and is particularly effective in the case of using two material rolls in which absorption axes of the polarizing plates constructing the optical film are the same direction. A direction of the absorption axis of the polarizing plate generally comes to a long direction of the material roll. Further, in the case of the retardation film, there is cases that a lagging axis coincides with the long direction of the material roll, is vertical, comes to a diagonal direction at a fixed angle, and the like. In the following description, there may be a case that the optical film in which the surface protecting film and the release film are laminated is called as a sheet material. It is to be noted that the sheet material of the present invention is not limited to the structure including the surface protecting film and the release film, but may be a structure in which at least one of them is not included, and may be structured, for example, such that the other film is bonded to the optical film.

(Manufacturing Flow Chart)

A manufacturing method for the optical display device in accordance with the present invention is a manufacturing method for an optical display device obtained by bonding an optical film having the optical anisotropy to an optical display unit, and is preferably a manufacturing method for an optical display device obtained by bonding an optical film including a polarizing plate to an optical display unit.

The manufacturing method of the invention includes a first cutting and bonding step and a second cutting and bonding step. The manufacturing method preferably further includes a feeding step between the first and second cutting and bonding steps. The first and second cutting and bonding steps may be performed in any order or at the same time.

The first cutting and bonding step is to cut the first sheet material into a length corresponding to a long side of the optical display unit by using a roll around which the first sheet material having a long first optical film with a width corresponding to a short side of the optical display unit is wound, and thereafter bond at least the first optical film in the pieces of cut first sheet materials, to one surface of the optical display unit.

The second cutting and bonding step is structured so as to cut the second sheet material into a length corresponding to a short side of the optical display unit by using a roll around which the second sheet material having a long second optical film with a width corresponding to a long side of the optical display unit is wound, and thereafter bond at least the second optical film in the pieces of cut second sheet materials, to the other surface of the optical display unit.

In the present embodiment, it is preferable that the first cutting and bonding step and the second cutting and bonding step include a cutting control step of controlling the cutting means for cutting the long sheet material, and a bonding control step of controlling a bonding position at a time of bonding at least the optical film in the cut pieces of sheet materials to the optical display unit.

The manufacturing method for the optical display device according to the present invention more particularly includes, for example, a first cutting and bonding step of drawing out the first sheet material from the roll around which the long first sheet material having the first optical film is wound so as to cut into a predetermined length, and thereafter bonding at least the first optical film in the pieces of cut first sheet materials, to the one surface of the optical display unit while feeding, and a second cutting and bonding step of drawing out the second sheet material from the roll around which the long second sheet material having the second optical film is wound so as to cut into a predetermined length, and thereafter bonding at least the second optical film in the pieces of cut second sheet materials, to the other surface of the optical display unit while feeding.

The first cutting and bonding step is executed, for example, by (2) a feeding step to (5) a first optical film bonding step which are mentioned below, and the second cutting and bonding step is executed, for example, by (8) a feeding step to (11) a second optical film bonding step which are mentioned below.

(1) First Material Roll Providing Step (S1 in FIG. 1). A long first sheet material is provided as a first material roll. A width of the first material roll depends on a bonding size of the optical display unit. Specifically, the width of the first material roll is decided in correspondence to one of the long side and the short side of the optical display unit, and the width of the second material roll is decided in correspondence to the other. Accordingly, the first material roll and the second material roll have the different widths, and there is used a material which is previously slit at a predetermined width in accordance with a slitting process from the material roll before slitting.

The slitting process is carried out while rewinding the material roll before slitting, and as a method thereof, there can be listed up a method of using a laser cutting apparatus, or a cutting tool such as a rotating round blade or the like. The process of producing the material roll preferably includes slitting the unslit material in the longitudinal direction and winding the resulting long sheet material into a roll. A conceivable method for producing a material roll with a width corresponding to the long or short side of the optical display unit can include cutting the unslit material roll itself from one or both ends thereof. In such a method, however, the unslit material roll can be cut in such a condition that winding displacement occurs (such a condition that the roll does not have a flat end face), so that the axis direction of the optical film can be non-uniform in the produced material roll. In contrast, when the slitting step is followed by the winding step as described above, the axis of the optical film in the produced material roll has a uniform direction, so that the optical film can be bonded to the optical display unit with high axis precision. The object to be slit does not have to be in the form of a roll such as a roll of an unslit material and may be an unwound long material (such as a long material before wound up after produced). When the optical film contains a polarizing plate, the absorption axis preferably extends in the longitudinal direction of the long material. In such a case, the long material is preferably slit parallel to the absorption axis, and then the resulting long sheet material is preferably wound into a roll.

In the present invention, the description "in correspondence to the long side or the short side of the optical display unit" indicates a length (a length except an exposed portion) of the bonding of the optical film corresponding to the length of the long side or the short side of the optical display unit, and it is not necessary that the length of the long side or the short side of the optical display unit is the same as the width of the optical film.

Figure 8:
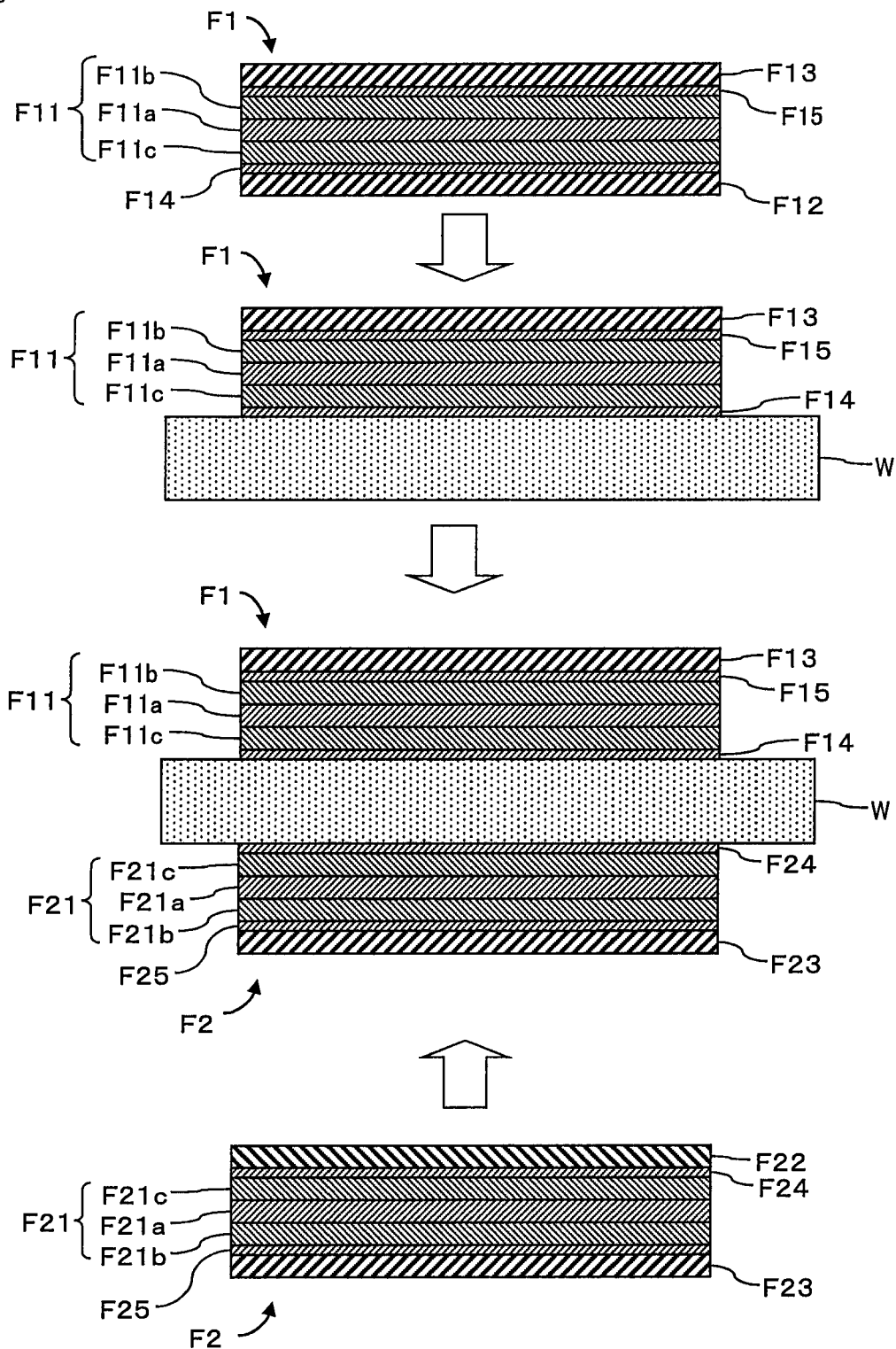
FIG. 8 is a diagram for illustrating an example of the laminated structure of each of first and second optical films.

As shown in FIG. 8, for example, a lamination structure of a first sheet material F1 has a first optical film F11, a first release film F12 and a surface protecting film F13. The first optical film F11 is configured by a first polarizer F11a, a first film F11b provided on one face via an adhesive layer (not shown), and a second film F11c provided on the other face via the adhesive layer (not shown).

The first and second films F11b and F11c are configured, for example, by a polarizer protecting film (for example, a tri-acetyl cellulose film, a PET film or the like). The second film F11c is bonded to the optical display unit face side via a first pressure-sensitive adhesive layer F14. A surface treatment can be applied to the first film F11b. As the surface treatment, for example, there can be listed up a hard coating, an anti-reflection treatment, a treatment aiming at a prevention of a sticking, a diffusion and an anti-glare, and the like. The first release film F12 is provided via the second film F11c and the first pressure-sensitive adhesive layer F14. Further, the surface protecting film F13 is provided via the first film F11b and the pressure-sensitive adhesive layer F15. In the following description, there is a case that the laminated structure of the polarizer and the polarizer protecting film is called as the polarizing plate.

It is preferable that each of the following steps is carried out within an isolating construction which is isolated in a factory, and a cleanliness factor is maintained. It is particularly preferable that the cleanliness factor is maintained in a bonding step bonding the optical film to the optical display unit.

(2) Feeding Step (S2 in FIG. 1). The first sheet material F1 is unwound from the provided and placed first material roll, and is fed to a downstream side. The first feeder 12 feeding the first sheet material F1 is constructed, for example, by a pair of nip rollers, a tension roller, a rotary drive, an accumulator A, a sensor, a controller and the like.

(3) First Inspection Step (S3 in FIG. 1). A defect of the first sheet material F1 is inspected by using a first defect inspection apparatus 14. As a defect inspection method in this case, there can be listed up a method of performing imaging and image processing generated by a transmitted light and a reflected light with respect to both faces of the first sheet material F1, a method of performing imaging and image processing by arranging a polarization film for inspection between a CCD camera and a subject to be inspected, in such a manner as to form crossed nicols relation (which may be called as 0 degree cross) to a polarization axis of the polarization plate corresponding to the subject to be inspected, and a method of performing imaging and image processing by arranging a polarization film for inspection between a CCD camera and a subject to be inspected, in such a manner as to form a predetermined angle (for example, in a range larger than 0 degree and less than 10 degree) (which may be called as x degree cross) to a polarization axis of the polarization plate corresponding to the subject to be inspected. In this case, a known method can be applied to an algorithm of the image processing, for example, the defect can be detected by gray-scale determination in accordance with a binarization processing.

In the performing imaging and image processing method by the transmitted light, it is possible to detect a contaminant in an inner portion of the first sheet material F1. In the performing imaging and image processing method by the reflected light, it is possible to detect a contaminant attached to the front face of the first sheet material F1. In the performing imaging and image processing method by the 0 degree cross, it is possible to mainly detect a contaminant on the front face, a dirty, a contaminant in an inner portion and the like as a bright spot. In the performing imaging and image processing method by the x degree cross, it is possible to mainly detect a knick.

The information of the defect obtained by the first defect inspection apparatus 14 is associated with its positional information (for example, a position coordinate), is transmitted to a controller 1, and can contribute to a cutting method by a first cutting apparatus 16 mentioned below.

(4) First cutting step (FIG. 1, S4). The first cutting apparatus 16 cuts the first sheet material F1 into a predetermined size by cutting the surface protecting film F13, the adhesive layer F15, the first optical film F11, the first adhesive layer F14 and the first release film F12.

With regard to the cutting length, for example, in correspondence to one of the long side and the short side of the optical display unit, in the case that the width of the first material roll corresponds to the short side, the optical film is cut into the length corresponding to the long side, or in the case that the width of the first material roll corresponds to the long side, the optical film is cut into the length corresponding to the short side. In the present embodiment, as shown in FIG. 3A, there is shown an example in the case that the width of the first material roll (the first sheet material F1) corresponds to the short side of the optical display unit W.

Figure 11:
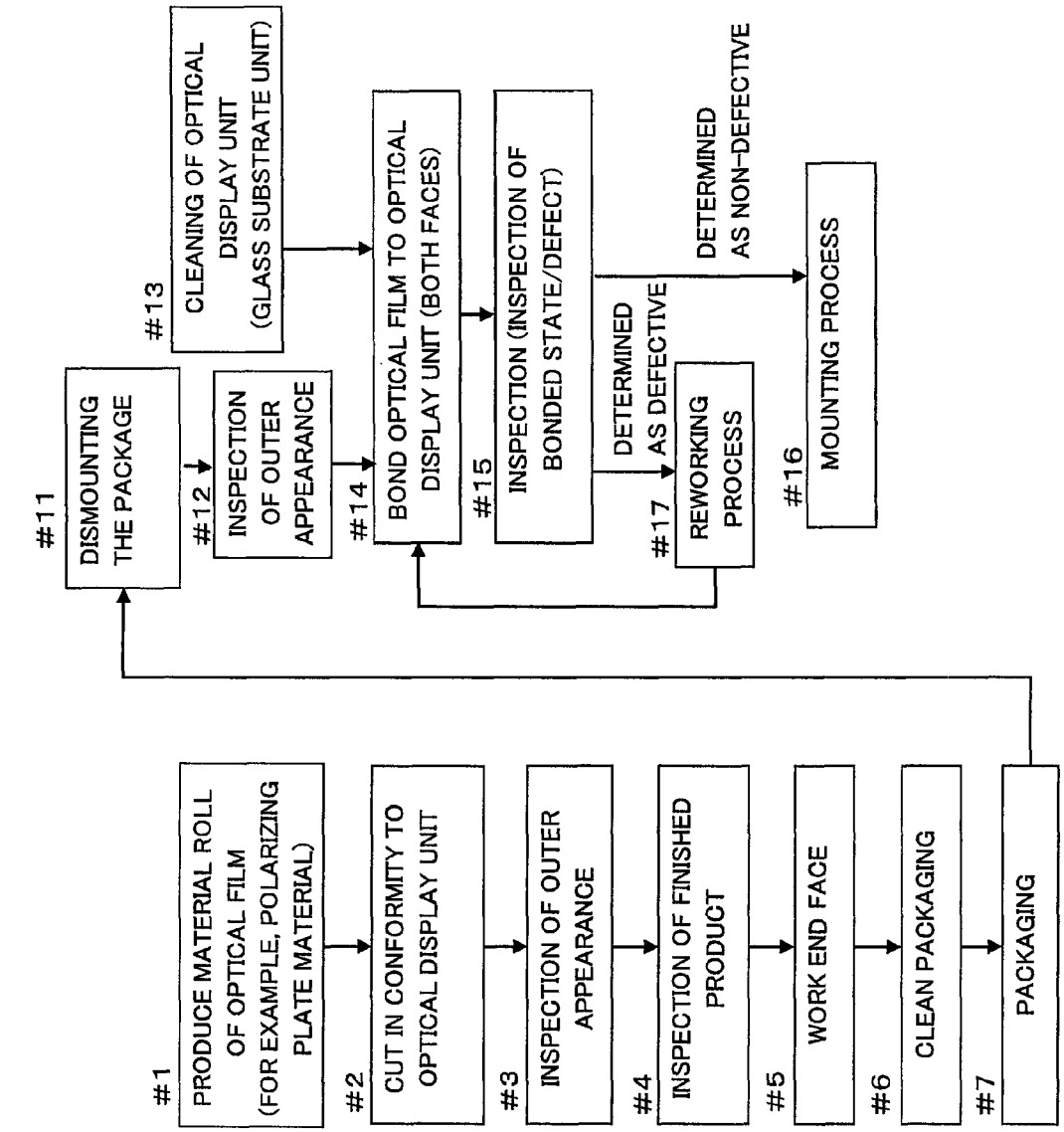
FIG. 11 is a flowchart of a conventional optical display device manufacturing method.

The first cutting step can be executed by optional cutting means for cutting the first long sheet material. Preferably, the first cutting step is a step of horizontally moving the cutting means in a width direction of the first long sheet material and cutting the first long sheet material. The cutting means is not particularly limited, but preferably includes a laser beam or a cutting tool (for example, a round blade). With the method mentioned above, since the end surface of the cut first sheet material F1 becomes smoother in comparison with the conventional cutting method of pressing the cutting tool (moving up and down the cutting means), the end surface work is not necessary. Since the end surface work (#5 in FIG. 11) is a process of superposing a plurality of sheet materials so as to cut their end surfaces, and a continuity from the first cutting step to the first bonding step is disconnected by this process, it causes a reduction of a productivity of the optical display device. According to the present invention, the continuity from the first cutting step to the first bonding step can be secured, and the productivity can be significantly improved.

It is preferable that the first cutting step includes a first cutting control step of controlling the cutting means for cutting the first sheet material F1. The first cutting control step can be carried out by the first cutting control means, and the first cutting control means reads, for example, a leading end (a rewinding leading end) of the fed first long sheet material by imaging means such as a camera, and regulates a cutting angle of a rear end based on the result thereof. Accordingly, the cut pieces of first sheet materials are prevented from becoming a parallelogram or a trapezoidal shape, and are formed more precisely into a rectangular shape. In a second cutting step mentioned below, it is preferable that a second cutting control step is carried out by a second cutting control means for controlling the cutting means for cutting the second sheet material F2, in the same manner.

Based on the information of the defect obtained by the first defect inspection apparatus 14, the structure is made so as to cut while avoiding the defect, in such a manner that the defect is not included in the region bonded to the optical display unit W. Accordingly, the yield ratio of the first sheet material F1 is significantly improved. As mentioned above, the method of cutting while avoiding the defect in such a manner that the defect is not included in the region bonded to the optical display unit W is called a skip cut, however, the defect information at a time of cutting may be obtained by an in-line defect inspection apparatus or may be previously attached to a material roll. The first sheet material F1 including the defect is rejected by a first rejection apparatus 19 mentioned below, and is structured such as not to be bonded to the optical display unit W. In other words, in the present invention, it is preferable to include a rejection step of a defect portion for cutting and rejecting a portion having a defect of the sheet material at a time of feeding the first sheet material F1 and the second sheet material F2.

(5) First bonding step (FIG. 1, S5). The piece of first optical film F11 (the surface protecting film F13, the adhesive layer F15, the first optical film F11 and the first adhesive layer F14) from which the first release film F12 is removed, is bonded to the optical display unit W with the first adhesive layer F14 interposed therebetween by using the first bonding apparatus 18 while removing the first release film F12 from the piece of cut first sheet material F1 by using the first peeling apparatus 17. At a time of bonding, the first optical film F11 and the optical display unit W are pressure bonded while being pinched by the roll pair (181, 182), as mentioned below.

It is preferable that the first bonding step includes a first bonding control step of controlling a bonding position at a time of bonding at least the first optical film F11 in the cut pieces of first sheet materials F1 to the optical display unit W. The first bonding control step can be carried out by the first bonding control means, and the first bonding control means temporarily stops, for example, the fed pieces of first sheet materials F1 by a stopping means (for example, a stop pin), aligns with the positions (XY coordinate) of the long side and the short side of the optical display unit W, and thereafter bonds the first optical film F11 to the optical display unit W. It is possible to improve an axial precision in the bonding of the first optical film F11 with respect to the optical display unit W, by carrying out the first cutting control step and the first bonding control step as mentioned above, while using the first roll material which is manufactured by slitting the long material as mentioned above and thereafter winding the obtained first sheet material F1. In the second bonding step mentioned below, in the same manner, it is preferable that the second bonding control step is carried out by the second bonding control means for controlling the bonding position at a time of bonding at least the second optical film F21 in the cut pieces of second sheet materials F2 to the optical display unit W.

(6-1) Cleaning step (FIG. 1, S6-1). The optical display unit W is cleaned its surface by a polishing cleaning, a water cleaning or the like. The cleaned optical display unit W is fed to an inspection apparatus.

(6-2) Inspection Step (S6-2 in FIG. 1). The optical display unit W after being cleaned is inspected its surface by the inspection apparatus. The panel W after being inspected is fed to the first bonding apparatus 18.

It is preferable that the first material roll providing step, the first inspecting step, the first cutting step, the first optical film bonding step, the cleaning step and the inspection step are set to a continuous production line. The first optical film F11 is bonded to one face of the panel W through a series of production steps mentioned above. In the following description, a description will be given below of a production steps bonding the second optical film F21 to the other face.

(7) Second Material Roll Providing Step (S11 in FIG. 1). The long second sheet material F2 is provided as the second material roll. As shown in FIG. 8, a laminated structure of the second sheet material F2 is the same structure as the first sheet material, however, is not limited to this. The second sheet material F2 has the second optical film F21, a second release film F22, and a surface protecting film F23. The second optical film F21 is configured by a second polarizer 21a, a third film F21b provided on one face thereof via an adhesive layer (not shown), and a fourth film F21c provided on the other face thereof via an adhesive layer (not shown).

The third and fourth films F21b and F21c are configured, for example, by a polarizer protecting film (for example, a tri-acetyl cellulose film, a PET film or the like). The fourth film F21c is bonded to the optical display unit face side via a second pressure-sensitive adhesive layer F24. A surface treatment can be applied to the third film F21b. As the surface treatment, for example, there can be listed up a hard coat treatment, a reflection preventing treatment, a treatment aiming at a prevention of a sticking, a diffusion and an anti-glare, and the like. The second release film F22 is provided via the fourth film F21c and the second pressure-sensitive adhesive layer F24. Further, the surface protecting film F23 is provided via the third film F21b and the pressure-sensitive adhesive layer F25.

(8) Feeding Step (S12 in FIG. 1). The second sheet material F2 is unwound from the provided and placed second material roll, and is fed to a downstream side. The second feeder 22 feeding the second sheet material is constructed, for example, by a pair of nip rollers, a tension roller, a rotary drive, an accumulator A, a sensor, a controller and the like.

(9) Second Inspecting Step (S13 in FIG. 1). A defect of the second sheet material F2 is inspected by using a second defect inspection apparatus 24. The defect inspecting method in this case is the same as the method by the first defect inspection apparatus mentioned above.

(10) Second Cutting Step (S14 in FIG. 1). A second cutting apparatus 26 cuts the surface protecting film F23, the pressure-sensitive adhesive layer F25, the second optical film F21, the second pressure-sensitive adhesive layer F24 and the second release film F22 into a predetermined size. Specifically, in correspondence to one of the long side and the short side of the optical display unit, in the case that the width of the second material roll corresponds to the short side, the optical film is cut into the length corresponding to the long side, or in the case that the width of the second material roll corresponds to the long side, the optical film is cut into the length corresponding to the short side. In the present embodiment, as shown in FIG. 3A, there is shown an example in which the width of the second material roll (the second sheet material F2) corresponds to the long side of the optical display unit W.

The second cutting step can be executed by optional cutting means for cutting the second long sheet material. Preferably, the second cutting step is a step of horizontally moving the cutting means in a width direction of the second long sheet material and cutting the second long sheet material. The cutting means is not particularly limited, but preferably includes a laser beam or a cutting tool (for example, a round blade). According to the method mentioned above, since the end surface of the cut second sheet material F2 becomes smoother in comparison with the conventional cutting method of pressing the cutting tool (moving up and down the cutting means), the end surface work is not necessary. Since the end surface work (#5 in FIG. 11) is a process of superposing a plurality of sheet materials so as to cut their end surfaces, and a continuity from the second cutting step to the second bonding step is disconnected by this process, it causes a reduction of a productivity of the optical display device. According to the present invention, the continuity from the second cutting step to the second bonding step can be secured, and the productivity can be significantly improved.

Based on the information of the defect obtained by the second defect inspection apparatus 24, the structure is made so as to cut while avoiding the defect, in such a manner that the defect is not included in the region bonded to the optical display unit W. Accordingly, a yield ratio of the second sheet material F2 is widely improved. The second sheet material F2 including the defect is excluded by a second rejection apparatus 29 mentioned below, and is structured such as not to be attached to the optical display unit W.

(11) Second bonding step (FIG. 1, S15). Next, The piece of second optical film F21 (the surface protecting film F23, the adhesive layer F25, the second optical film F21 and the second adhesive layer F24) from which the second release film F22 is removed, is bonded to a surface different from the surface to which the first optical film F11 of the optical display unit W is bonded, with the second adhesive layer F24 interposed therebetween, by using the second bonding apparatus 28, while removing the second release film F22 from the pieces of cut second sheet materials, by using the second peeling apparatus 27, after the second cutting step. There is a case that the optical display unit W is turned over by the turning-over mechanism as well as setting the first optical film F11 and the second optical film F21 to a crossed nicols relation by rotating the optical display unit W at 90 degree by means of a feeding direction switching mechanism of the feeding mechanism R, before bonding the second optical film F21 to the optical display unit W.

(12) Transporting and feeding step (FIG. 1, S7). Preferably, the manufacturing method according to the present invention further includes a transporting and feeding step between the first cutting and bonding step and the second cutting and bonding step, and the transporting and feeding step includes a turning step of turning the optical display unit from the bonding direction of any one cutting and bonding apparatus of the first cutting and bonding apparatus and the second cutting and bonding apparatus to the bonding direction of the other cutting and bonding apparatus. More preferably, the transporting and feeding step further includes a turning-over step of turning over the optical display unit in addition to the turning step. In the present invention, it is preferable to carry out the turning step at such an angle that a direction of the long side of the first optical film F11 bonded to the optical display unit W after being turned, and a direction of the long side of the second optical film F21 bonded after being cut comes to 0±5°, preferably 0±1°. For example, in the case that the line direction of the fed first optical film F11 is in parallel to (including on the same line) the line direction of the fed second optical film F21, a turning angle in the turning step is preferably between 85° and 95°. At a time of bonding, as will be described later, the second optical film F21 and the optical display unit W are pressure bonded by being pinched by the rolls.

(13) Inspection step of optical display device (FIG. 1, S16). The inspection apparatus inspects the optical display device in which the optical films are bonded to both the surfaces of the optical display unit W. As an inspecting method, there can be exemplified a method of performing imaging and image processing by the reflected light with respect to both the faces of the optical display unit. Further, as the other method, there can be listed up a method of using the polarization film for inspecting placed between the CCD camera and the subject to be inspected. In this case, a known method can be applied to an algorithm of the image processing, and it is possible to detect the defect, for example, by grayscale determination in accordance with a binarization processing.

(14) A non-defective of the optical display unit is determined based on the information of the defect obtained by the inspecting apparatus 30. The optical display unit determined as the non-defective is fed to the next mounting process. In the case that a defective is determined, a reworking process is applied, and the optical film is bonded newly, and is next inspected. In the case that the non-defective is determined, the process gives way to the mounting process, and in the case that the defective is determined, the process again gives way to the reworking process or the defective is put on the shelf.

In a series of production steps mentioned above, it is possible to suitably produce the optical display unit by setting the bonding step of the first optical film F11 and the bonding step of the second optical film F21 to the continuous production line.

(Other Embodiment of Cutting Method while Avoiding Defect)

Further, a description will be given below of the other embodiment of the first cutting step and the second cutting step mentioned above. This embodiment is particularly effective in the case that the first inspection step and the second inspection step mentioned above are not provided. There is a case that defect information (defect coordinate, kind of defect, size and the like) of the first and second sheet materials is attached as code information (for example, QR code or bar code) to one end portion in a width direction of the first and second material rolls at a predetermined pitch unit (for example, 1000 mm). In the case mentioned above, it is cut into a predetermined size in the first and second cutting steps, in such a manner as to read and analyze the code information so as to avoid the defect portion, in the prior stage to the cutting. Further, the structure is made such that the portion including the defect is rejected or bonded to the other member than the optical display unit, and the structure is made so as to bond at least the optical film in the pieces of sheet materials which are cut into the predetermined size and are determined as the non-defective, to the optical display unit. Accordingly, the yield ratios of the sheet materials F1 and F2 are significantly improved.

In one embodiment, the manufacturing method according to the present invention includes a first reserving step of sequentially reserving the pieces of first sheet materials until cutting the pieces of first sheet materials from the first long sheet material and bonding it to the optical display unit, in the first cutting and bonding step. In the first cutting and bonding step, in the case that the cutting speed of the first cutting step is higher than the bonding speed of the first bonding step, the excess first sheet materials may be manufactured. In the case mentioned above, since the first cutting and bonding step includes the first reserving step, it is possible to regulate the supply amount of the first sheet materials to be supplied to the bonding step. It is preferable that the manufacturing method according to the present invention includes a second reserving step in same manner in the second cutting and bonding step.

(Structure of Whole of Manufacturing System)

Next, a description will be given of a structure of a whole of a manufacturing system in accordance with the present invention. The manufacturing system of the present invention is a manufacturing system for an optical display device obtained by bonding an optical film having the optical anisotropy to an optical display unit, and is preferably a manufacturing system for an optical display device obtained by bonding an optical film including a polarizing plate to the optical display unit. The manufacturing system in accordance with the present invention is provided with a first cutting and bonding apparatus carrying out a first cutting and bonding step, and a second cutting and bonding apparatus carrying out a second cutting and bonding step.

In the present embodiment, as shown in FIG. 3A, there is shown an example which is provided with a feeder M1 of the optical display unit W, a feeder M2 of the first sheet material F1, a first bonding apparatus M3 bonding the first optical film F11, a feeder M4 feeding the optical display unit W after being bonded, a feeder M5 of the second sheet material F2, and a second bonding apparatus M6 bonding the second optical film F21. In this example, the first cutting and bonding apparatus includes the feeder M2 of the first sheet material F1 and the first bonding apparatus M3 bonding the first optical film F11, and the second cutting and bonding apparatus includes the feeder M5 of the second sheet material F2 and the second bonding apparatus M6 bonding the second optical film F21.

In the present embodiment, as shown in FIG. 3A, there is shown the example in which the feeder M2 of the first sheet material F1, the first bonding apparatus M3, the feeder M4, the feeder M5 of the second sheet material F2, and the second bonding apparatus M6 are arranged linearly, and the feeder M1 is arranged in such a manner that the optical display unit W is fed from a direction which is vertical to a panel flow direction of the first bonding apparatus M3.

(Structure of Each of Portions of Manufacturing System)

Figure 4:
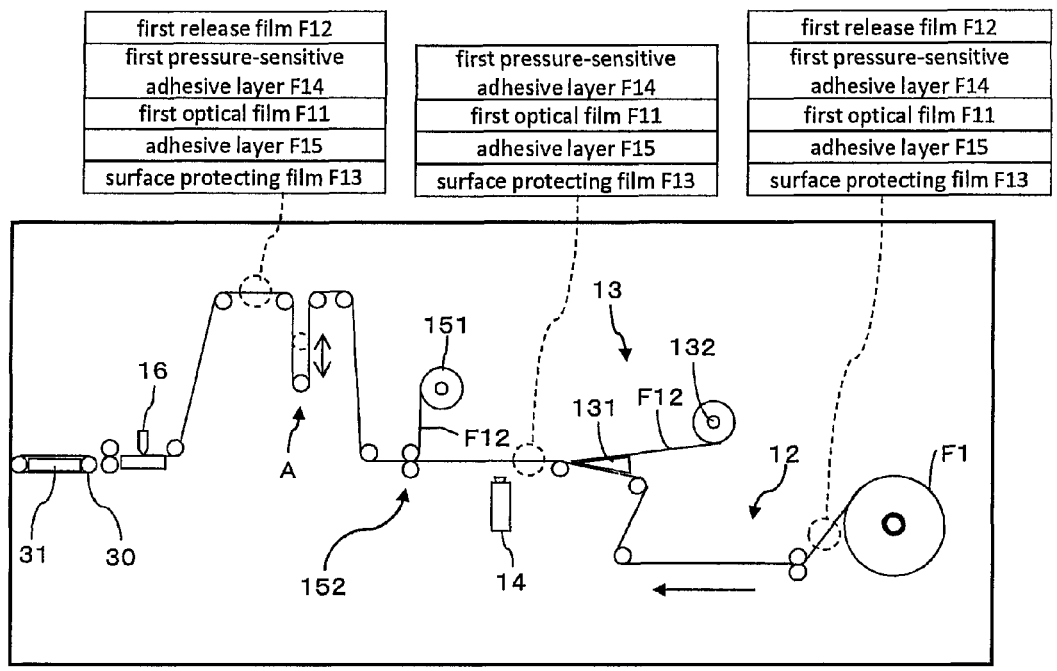
FIG. 4 is a diagram for illustrating a machine structure of an example of the manufacturing system of the invention.

A description will be given below of an example of a structure of each of the portions of the manufacturing system in accordance with the present invention. FIG. 4 is a view showing a first feeder 12, a first pre-inspection peeling apparatus 13, a first defect inspection apparatus 14, a first release film laminating apparatus 15, and a second cutting apparatus 16.

Figure 5:
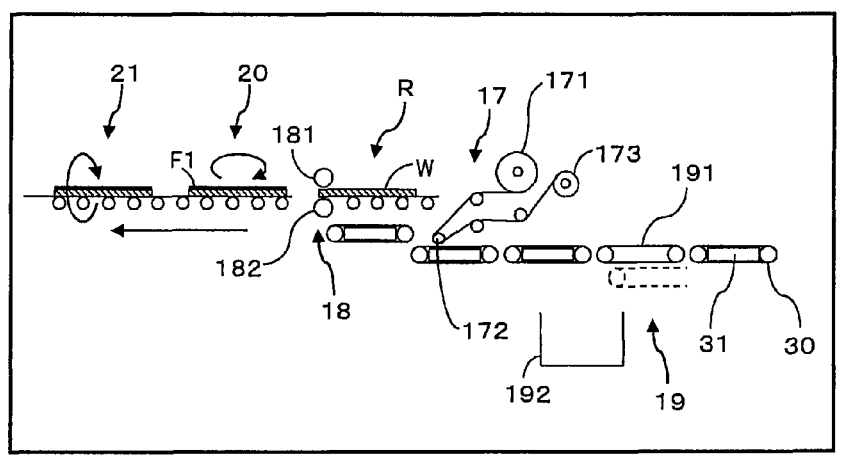
FIG. 5 is a diagram for illustrating a machine structure of an example of the manufacturing system of the invention.
Figure 6:
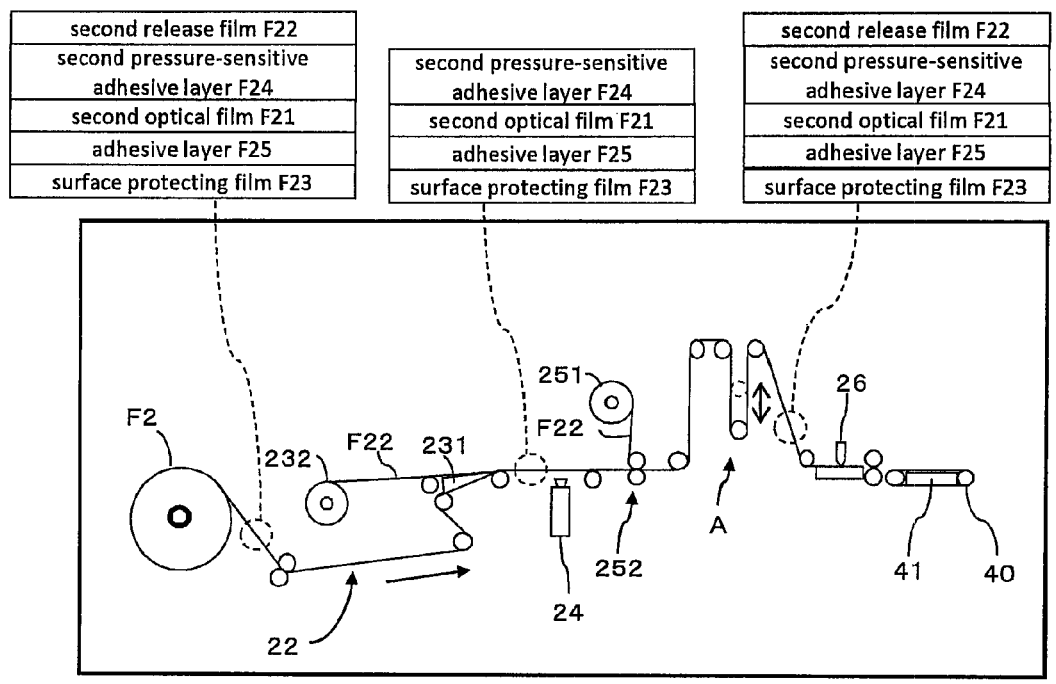
FIG. 6 is a diagram for illustrating a machine structure of an example of the manufacturing system of the invention.
Figure 7:
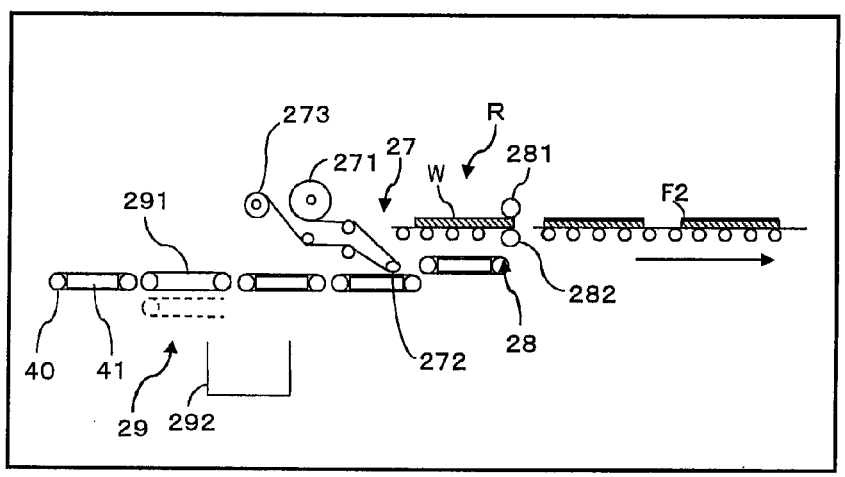
FIG. 7 is a diagram for illustrating a machine structure of an example of the manufacturing system of the invention.

FIG. 5 is a view showing a first peeling apparatus 17, a first bonding apparatus 18 and a first rejection apparatus 19. FIG. 6 is a view showing a second feeder 22, a second pre-inspection peeling apparatus 23, a second defect inspection apparatus 24, a second release film laminating apparatus 25, and a second cutting apparatus 26. FIG. 7 is a view showing a second peeling apparatus 27, a second bonding apparatus 28 and a second rejection apparatus 29.

The manufacturing system in accordance with the present invention is provided with the feeder M1 of the optical display unit feeding the optical display unit W. In the present invention, the feeder M1 of the optical display unit may be constructed only by the feeder mechanism R.

The manufacturing system in accordance with the present invention is provided with the feeder M2 of the first sheet material F1 which draws out the long sheet material F1 from the roll around which the long sheet material having the first optical film F11 is wound, and feeds after cutting into the predetermined length. In the present embodiment, there is shown an example in which the feeder M2 of the first sheet material F1 is provided with the first feeder 12, the first pre-inspection peeling apparatus 13, the first defect inspection apparatus 14, the first release film laminating apparatus 15, and the first cutting apparatus 16, as shown in FIG. 4. In the present invention, on the basis of the provision of the first pre-inspection peeling apparatus 13, the first defect inspection apparatus 14, and the first release film laminating apparatus 15, it is possible to precisely carry out the inspection of the first optical film, however, these apparatuses can be omitted.

In the present invention, the feeder M2 of the first sheet material F1 is structured such as to cut the first sheet material F1 having the width corresponding to the short side into the length corresponding to the long side, or is structured such as to cut the first sheet material F1 having the width corresponding to the long side into the length corresponding to the short side, in correspondence to the long side and the short side of the optical display unit. In the present embodiment, there is shown the example in which the feeder M2 of the first sheet material F1 cut the first sheet material F1 having the width corresponding to the short side of the optical display unit into the length corresponding to the long side.

The first material roll of the long first sheet material F1 is installed to a roll mount apparatus working with a motor or the like in such a manner as to rotate free or rotate at a fixed rotating speed. The rotating speed is set by a controller 1 and is drive-controlled.

The first feeder 12 is a feeding mechanism feeding the first sheet material F1 to a downward side. The first feeder 12 is controlled by the controller 1.

The first pre-inspection peeling apparatus 13 is structured such as to peel off the first release film F12 from the fed first sheet material F1, and wind around the roll 132. The winding speed around the roll 132 is controlled by the controller 1. The peeling mechanism 131 is structured such as to have a knife edge portion having a sharp leading end, peel off the first release film F12 by winding the first release film F12 around the knife edge portion so as to reverse transfer, and feed the first sheet material F1 after peeling off the first release film F12 in the feeding direction.

The first inspecting apparatus 14 inspects the defect after peeling off the first release film F12. The first inspecting apparatus 14 analyzes an image data photographed by a CCD camera so as to detect the defect, and calculates a position coordinate thereof. The position coordinate of this defect is provided for the skip cut by the first cutting apparatus 16 mentioned below.

The first release film laminating apparatus 15 laminates a first release film F12 to the first optical film F11 via the first pressure-sensitive adhesive layer F14 after the first defect inspection. As shown in FIG. 4, the first release film F12 is unwound from the material roll 151 of the first release film F12, and the first release film F12 and the first optical film F11 are pinched by one or a plurality of roller pairs 152, and are laminated by applying a predetermined pressure by means of the roller pairs 152. A rotating speed, a pressure and a feeding of the roller pairs 152 are controlled by the controller 1. The first release film F12 bonded to the first optical film F11 by the first release film bonding apparatus 15 may be identical to the first release film F12 which is peeled from the first sheet material F1 by the first pre-inspection peeling apparatus 13, or may be different therefrom.

As shown in FIG. 4, the present embodiment is structured such that the first sheet material F1 is fed in a state in which it is directed upward in its first release film F12 side. In other words, the first sheet material F1 delivered from the first material roll in a state of being directed upward in its first release film F12 side is structured such that the first release film F12 corresponding to the top layer is peeled by the first pre-inspection peeling apparatus 13, and is inspected by the first defect inspection apparatus 14, and the first release film F12 is bonded again via the first adhesive layer F14. Thereafter, the piece of first sheet material cut by the first cutting apparatus 16 mentioned below is bonded to one surface of the optical display unit W with the first adhesive layer F14 interposed therebetween from the lower side, after the first release film F12 is peeled.

The first cutting apparatus 16 cuts the first optical film F11, the first release film F12, the surface protecting film F13, the first adhesive layer F14, and the adhesive layer F15 into a predetermined size. The first cutting apparatus 16 is cutting means for horizontally moving in a width direction of the first long sheet material so as to cut the first long sheet material. The cutting means is not particularly limited, but preferably includes a laser beam or a round blade. Based on a position coordinate of the defect inspected by the first defect inspection apparatus, the first cutting apparatus 16 cuts into the predetermined size while avoiding the defect portion, in such a manner as to prevent from including the defect in the region bonded by the optical display unit W. In other words, the cut material including the defect portion is rejected as the defective by a first rejection apparatus 19 in the later step. Alternatively, the first cutting apparatus 16 may continuously cut into the predetermined size while disregarding the existence of the defect. In this case, the structure may be made so as to reject the portion without bonding, in a bonding process mentioned below. The control in this case may be based on the function of the controller 1.

Further, the first cutting apparatus 16 arranges a holding table sucking and holding the first sheet material F1 from the back surface, and is provided with a laser apparatus above the first sheet material F1. The first cutting apparatus 16 makes the laser horizontally move in such a manner as to scan in the width direction of the first sheet material F1, and cuts (hereinafter, appropriately referred to as "fully cut") the first optical film F11, the first release film F12, the first adhesive layer F14, the surface protecting film F13 and the adhesive layer F15 at a predetermined pitch in its feeding direction. Further, it is preferable that the laser apparatus is integrally constructed in a state in which an air nozzle for blowing hot air toward the cut position and a smoke collecting duct for collecting gas (smoke) generated from the cut position and fed by the hot air are opposed, in such a manner as to pinch from the width direction of the first sheet material F1. An accumulate apparatus A of the feeding mechanism is structured so as to move up and down in a vertical direction so as to prevent the continuous feed of the first sheet material F1 in its downstream side and its upstream side from stopping in the case of sucking the first sheet material F1 by the holding table. This motion is based on the control of the controller 1.

The manufacturing system according to the present invention is provided with the first bonding apparatus 18 (M3) for bonding at least the first optical film F11 in the first sheet materials F1 fed from the feeder M2 of the first sheet material F1 to one surface of the optical display unit W fed from the feeder M1 of the optical display unit. In the present embodiment, there is shown an example in which the first bonding apparatus 18 (M3) is constructed by a press roller 182 and a guide roller 181, and a first peeling apparatus 17 and a first rejection apparatus 19 are further provided, as shown in FIG. 5. The feeding mechanism for the piece of first sheet material from the first cutting apparatus 16 to the first bonding apparatus 18 is provided with, for example, a conveyor 30, and a sucking apparatus 31 for sucking and holding the piece of first sheet material on the conveyor 30 from the back surface. The first rejection apparatus 19 is provided with, for example, a movable conveyor 191 and a defective recovering portion 192, and is structured such that when the cut material (the defective) of the first sheet material F1 including the defect portion reaches on the movable conveyor 191, the movable conveyor 191 is activated, and the defective on the movable conveyor 191 is recovered in the defective recovering portion 192. The first rejection apparatus 19 constructs a rejection mechanism of a defect portion for cutting and rejecting a portion having a defect in the first sheet material F1 together with the first cutting apparatus 16, however, the rejection mechanism mentioned above may be omitted.

The first bonding apparatus 18 bonds the piece of the first sheet material (the first optical film F11) from which the first release film F12 is peeled off by the first peeling apparatus 17 to the optical display unit W via the first pressure-sensitive adhesive layer F14, after the cutting step mentioned above. The feed path of the first sheet material F1 is below the feed path of the optical display unit W.

As shown in FIG. 5, in the case of bonding, the first optical film F11 is bonded to the optical display unit W surface while pressure welding by a pressing roller 181 and a guide roller 182. A pressing pressure and a driving motion of the pressing roller 181 and the guide roller 182 are controlled by the controller 1.

The first peeling apparatus 17 bonds the first release film F12 corresponding to the top layer of the piece of first sheet material to a adhesive layer of a peeling film 171, and winds the first release film F12 together with the peeling film 171 around a roller 173, by pressing a roller 172 around which the peeling film 171 is wound, against the piece of first sheet material from the above, by using the peeling film 171 in which a adhesive layer is formed in its surface. The piece of first sheet material (the first optical film F11) after peeling the first release film F12 is delivered to a lower surface of the optical display unit W. The motions of the rollers 172 and 173 are controlled by the controller 1.

The bonding mechanism is configured by the pressing roller 182 and the guide roller 181 arranged so as to oppose thereto. The guide roller 181 is configured by a rubber roller which is rotationally driven by a motor, and is arranged so as to be movable up and down. Further, the pressing roller 182 configured by a metal roller which is rotationally driven by a motor is arranged just above the same so as to be movable up and down. The pressing roller 182 is structured such as to be moved up to a higher position than a top face thereof so as to form a roller interval at a time of feeding the optical display unit W to the bonding position. In this case, each of the guide roller 181 and the pressing roller 182 may be configured by the rubber roller or the metal roller. The optical display unit W is cleaned by the various cleaning apparatuses as mentioned above, and is structured such as to be fed by the feeding mechanism R. The feed control of the feeding mechanism R is also controlled by the controller 1.

The optical display unit W to which the first optical film F11 is bonded as mentioned above is fed to a downstream side, and the second optical film F21 is bonded. In the following description, an explanation of the structure of the same apparatus will be briefly given.

The manufacturing system of the invention preferably further includes a feeder M4 placed between the first and second cutting and bonding apparatuses. The feeder M4 is an apparatus for transporting and feeding the optical display unit from one of the first and second cutting and bonding apparatuses to the other. The feeder preferably has a turning mechanism 20 that turns the optical display unit W from the direction of bonding in one of the first and second cutting and bonding apparatuses to the direction of bonding in the other cutting and bonding apparatus. Besides the turning mechanism 20, the feeder may further include a turning-over mechanism 21 for turning over the optical display unit.

For example, in the case that the second optical film F21 is bonded to the first optical film F11 in a relation of 90 degree (a relation of crossed nicols), the second optical film F21 is bonded after rotating the optical display unit W at 90 degree by a feed direction switching mechanism (turning mechanism 20) of the feeding mechanism R and then turning it over by the turning-over mechanism 21.

The manufacturing system in accordance with the present invention is provided with the feeder M5 of the second sheet material F2 which draws out the second sheet material F2 from the material roll around which the second sheet material F2 having the second optical film F21 is wound, and feeds after cutting into a predetermined length. In the present embodiment, there is shown an example in which the feeder M5 of the second sheet material F2 is provided with the second feeder 22, the second pre-inspection peeling apparatus 23, the second defect inspection apparatus 24, the second release film laminating apparatus 25, and the second cutting apparatus 26, as shown in FIG. 6. In the present invention, on the basis of the provision of the second pre-inspection peeling apparatus 23, the second defect inspection apparatus 24, and the second release film laminating apparatus 25, it is possible to precisely inspect the second optical film, however, these apparatuses can be omitted.

In the present invention, the feeder M5 of the second sheet material F2 is structured such as to cut the second sheet material F2 having the width corresponding to the short side into the length corresponding to the long side, or is structured such as to cut the second sheet material F2 having the width corresponding to the long side into the length corresponding to the short side, in correspondence to the long side and the short side of the optical display unit W. In the present embodiment, there is shown an example in which the feeder M5 of the second sheet material F2 is structured such as to cut the second sheet material F2 having the width corresponding to the long side of the optical display unit W into the length corresponding to the short side.

As shown in FIG. 6, the second material roll of the long second sheet material F2 is installed to the roll mount apparatus working with the motor or the like in such a manner as to rotate free or rotate at a fixed rotating speed. The rotating speed is set by the controller 1, and is drive-controlled.

The second feeder 22 is a feeding mechanism feeding the second sheet material F2 to a downward side. The second feeder 22 is controlled by the controller 1.

The second pre-inspection peeling apparatus 23 is structured such as to peel off a second release film F22 from the fed second sheet material F2 so as to wind around the roll 232. A winding speed around the roll 232 is controlled by the controller 1. The peeling mechanism 231 is structured such as to have a knife edge portion having a sharp leading end, peel off the second release film F22 by winding the second release film F22 around the knife edge portion so as to reverse transfer, and feed the second sheet material F2 after peeling off the second release film F22 in the feeding direction.

The second inspecting apparatus 24 inspects the defect after peeling off the second release film F22. The second inspecting apparatus 24 analyzes the image data photographed by the CCD camera so as to detect the defect, and calculates a position coordinate thereof. The position coordinate of this defect is provided for the skip cut by the second cutting apparatus 26 mentioned below.

The second release film laminating apparatus 25 laminates the second release film F22 to the second optical film F21 via the second pressure-sensitive adhesive layer F24 after the second defect inspection. As shown in FIG. 6, the second release film F22 is unwound from the material roll 251 of the second release film F22, and the second release film F22 and the second optical film F21 are pinched by one or a plurality of roller pairs 252, and are laminated by applying a predetermined pressure by means of the roller pairs 252. A rotating speed, a pressure and a feeding of the roller pairs 252 are controlled by the controller 1. The second release film F22 bonded to the second optical film F21 by the second release film bonding apparatus 25 may be identical to the second release film F22 which is peeled from the second sheet material F2 by the second pre-inspection peeling apparatus 23, or may be different therefrom.

As shown in FIG. 6, the present embodiment is structured such that the second sheet material F2 is fed in a state in which it is directed upward in its second release film F22 side. In other words, the second sheet material F2 delivered in a state of being directed upward in its second release film F22 side from the second material roll is structured such that the second release film F22 corresponding to its top layer is peeled by the second pre-inspection peeling apparatus 23, and the second release film F22 is bonded again to the second sheet material F2 with the second adhesive layer F24 interposed therebetween, after the inspection by the second defect inspection apparatus 24. Thereafter, the piece of second sheet material cut by a second cutting apparatus 26 mentioned below is bonded to the other surface of the optical display unit W with the second adhesive layer F24 interposed therebetween from its lower side, after the second release film F22 is peeled.

The second cutting apparatus 26 cuts the second optical film F21, the second release film F22, the surface protecting film F23, the second adhesive layer F24 and the adhesive layer F25 into a predetermined size. The second cutting apparatus 26 is cutting means for horizontally moving in a width direction of the second long sheet material so as to cut the second long sheet material. The cutting means is not particularly limited, but preferably includes a laser beam or a round blade. Based on a position coordinate of the defect inspected by the second defect inspection apparatus, the second cutting apparatus 26 cuts into the predetermined size while avoiding the defect portion, in such a manner as to prevent from including the defect in the region bonded by the optical display unit W. In other words, the cut material including the defect portion is rejected as the defective by a second rejection apparatus 29 in the later step. Alternatively, the second cutting apparatus 26 may continuously cut into the predetermined size while disregarding the existence of the defect. In this case, the structure may be made so as to reject the portion without bonding, in a bonding process mentioned below. The control in this case may be based on the function of the controller 1.

Further, the second cutting apparatus 26 arranges a holding table for sucking and holding the second sheet material F2 from the back surface, and is provided with a laser apparatus above the second sheet material F2. The second cutting apparatus 26 makes the laser horizontally move in such a manner as to scan in the width direction of the second sheet material F2, and cuts (fully cuts) the second optical film F21, the second release film F22, the second adhesive layer F24, the surface protecting film F23 and the adhesive layer F25 at a predetermined pitch in its feeding direction. The accumulate apparatus A of the feeding mechanism is structured so as to move up and down in a vertical direction so as to prevent the continuous feed of the second sheet material F2 in its downstream side and its upstream side from stopping in the case of sucking the second sheet material F2 by the holding table. This motion is based on the control of the controller 1.

The manufacturing system according to the present invention is provided with the second bonding apparatus 28 (M6) for bonding at least the second optical film F21 in the second sheet materials F2 fed from the feeder M5 of the second sheet material F2 to the other surface of the optical display unit W fed from the feeder M4. In the present embodiment, there is shown an example in which the second bonding apparatus 28 (M6) is constructed by a press roller 282 and a guide roller 281, and a second peeling apparatus 27 and a second rejection apparatus 29 are further provided, as shown in FIG. 7. The feeding mechanism for the piece of second sheet material from the second cutting apparatus 26 to the second bonding apparatus 28 is provided with, for example, a conveyor 40, and a sucking apparatus 41 for sucking and holding the piece of second sheet material on the conveyor 40 from the back surface. The second rejection apparatus 29 is provided with, for example, a movable conveyor 291 and a defective recovering portion 292, and is structured such that when the cut material (the defective) of the second sheet material F2 including the defect portion reaches on the movable conveyor 291, the movable conveyor 291 is activated, and the defective on the movable conveyor 291 is recovered in the defective recovering portion 292. The second rejection apparatus 29 constructs a rejection mechanism of a defect portion for cutting and rejecting a portion having a defect in the second sheet material F2 together with the second cutting apparatus 26, however, the rejection mechanism mentioned above may be omitted.

The second bonding apparatus 28 bonds the piece of second sheet material F2 (the second optical film F21) from which the release film F22 is peeled off by the second peeling apparatus 27 to the optical display unit W via the second pressure-sensitive adhesive layer F24, after the cutting step. As shown in FIG. 7, in the case of bonding, the second optical film F21 is bonded to the optical display unit W surface while pressure welding by a pressing roller 281 and a guide roller 282. A pressing pressure and a driving motion of the pressing roller 281 and the guide roller 282 are controlled by the controller 1.

The second peeling apparatus 27 bonds the second release film F22 corresponding to the top layer of the piece of second sheet material to a adhesive layer of a peeling film 271, and takes up the second release film F22 together with the peeling film 271 around a roller 273, by pressing a roller 272 around which the peeling film 271 is wound, against the piece of second sheet material from the above, by using the peeling film 271 in which a adhesive layer is formed in its surface. The piece of second sheet material (the second optical film F21) after peeling the second release film F22 is delivered to a lower surface of the optical display unit W which is turned over by the turning-over mechanism 21. The motions of the rollers 272 and 273 are controlled by the controller 1.

The bonding mechanism is configured by the pressing roller 282 and the guide roller 281 arranged so as to oppose thereto. The guide roller 281 is configured by a rubber roller which is rotationally driven by a motor, and is arranged so as to be movable up and down. Further, the pressing roller 282 configured by a metal roller which is rotationally driven by a motor is arranged just below the same so as to be movable up and down. The pressing roller 282 is structured such as to be moved down to a below position so as to form a roller interval at a time of feeding the optical display unit W to the bonding position. In this case, each of the guide roller 281 and the pressing roller 282 may be configured by the rubber roller or the metal roller.

The optical display device formed by bonding the first and second optical films to the optical display unit W is fed to the inspection apparatus. The inspection apparatus executes an inspection with respect to both the surfaces of the fed optical display device. The light source irradiates the upper surface of the optical display device by a half mirror, and images a reflected light image as an image data by a CCD camera. Further, the other light source irradiates the surface of the optical display device at a predetermined angle, and images a reflected light as an image data by the CCD camera. An inspection of the opposed surface of the optical display device is executed in the same manner by using the light source and the CCD camera. The defect is image processed and analyzed based on the image data, and a non-defective determination is executed.

An operation timing of each of the apparatuses is calculated, for example, by a method that a sensor is arranged at a predetermined position so as to detect, or is calculated in such a manner as to detect a rotating member of the feeder and the feeding mechanism R by a rotary encoder or the like. The controller 1 may be achieved by a cooperating action between a software program and a hardware resource such as a CPU, a memory or the like. In this case, the program software, a processing procedure, various settings and the like are previously stored in the memory. Further, it can be configured by a dedicated circuit, a firmware or the like.

The optical display device obtained by the manufacturing method of the invention includes the optical display units and the optical films bonded to both sides of the optical display unit. The optical display device can be used as an image display such as a liquid crystal display, an organic electroluminescence (EL) display, or a plasma display panel (PDP).

The liquid crystal display may be formed according to conventional techniques. Specifically, the liquid crystal display is usually formed by assembling a liquid crystal cell (corresponding to the optical display unit) and optical films, and optional components such as a lighting system and incorporating a driving circuit, according to any conventional techniques, except that the optical films are used according to the invention. The liquid crystal cell to be used may also be of any type such as TN (Twisted Nematic) type, STN (Super Twisted Nematic) type, or n type. In particular, a VA (Vertical Alignment) or IPS (In-Plane-Switching) mode liquid crystal cell is effectively used in an embodiment of the invention.

It is possible to form an appropriate liquid crystal display device such as a liquid crystal display device in which the optical film is arranged in one side or both sides of the liquid crystal cell, one in which a backlight or a reflector is used in the lighting system, and the like. In this case, the optical film in accordance with the present invention can be placed in one side or both sides of the liquid crystal cell. In the case that the optical film is provided in both sides, they may be the same or may be different. Further, at a time of forming the liquid crystal display device, it is possible to arrange appropriate parts, for example, a diffusion plate, an anti-glare layer, an anti-reflection film, a protective plate, a prism array, a lens array sheet, a light diffusion plate, a backlight and the like at appropriate positions in one layer or two layers or more.

The optical film in accordance with the present invention can be preferably used for forming various devices such as the liquid crystal display device and the like. The liquid crystal display device can be formed as a device having an appropriate structure based on conventional transmitting type, reflecting type or transmitting and reflecting both-way type in which the optical film in accordance with the present invention is arranged in one side or both sides of the liquid crystal cell. Accordingly, the liquid crystal cell forming the liquid crystal display device is optional, for example, it is possible to use an appropriate type of liquid crystal cell such as an simple matrix drive type represented by a thin film transistor type.

Further, in the case that the polarizing plate or the optical member is provided in both sides of the liquid crystal cell, they may be the same or may be different. Further, at a time of forming the liquid crystal display device, it is possible to arrange appropriate parts, for example, a prism array sheet, a lens array sheet, a light diffusion plate, a backlight and the like at appropriate positions in one layer or two layers or more.

Figure 9:
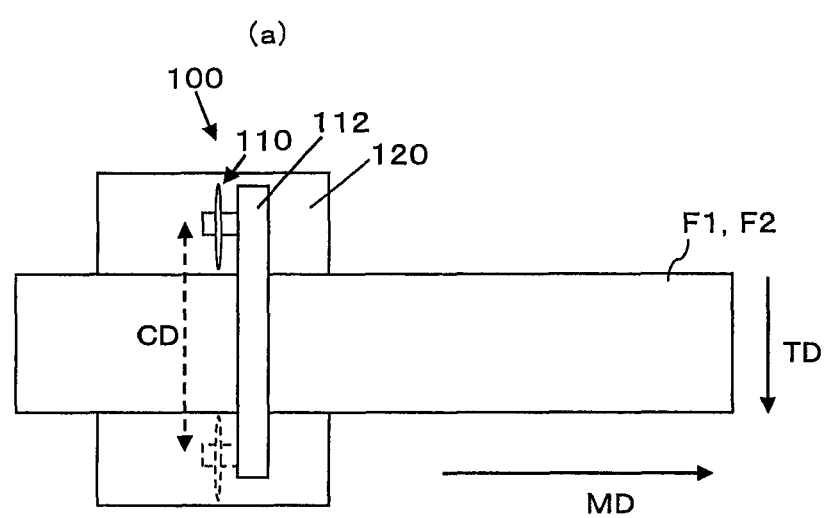
FIG. 9 is a diagram for illustrating a cutting means.
Figure 9:
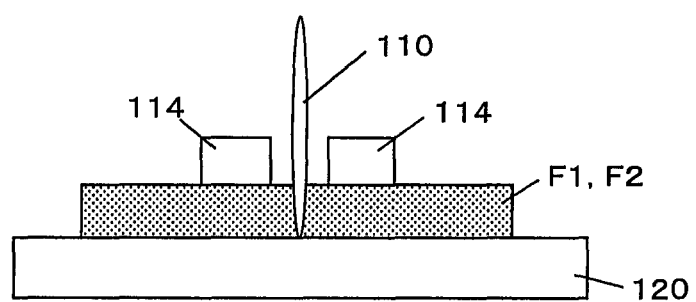

FIG. 9 is a view for explaining cutting means 100. The cutting means 100 is provided with a round blade 110, and a moving mechanism 112 structured such that it can reciprocate the round blade 110 in a cutting moving direction CD. A cut receiving plate 120 provided with a suction mechanism for holding the surfaces of the sheet materials F1 and F2 flat at a time of cutting by means of the round blade 110 is provided in an opposite side of the cutting means 100 while holding the sheet materials F1 and F2 therebetween. Further, in the case that the sheet materials F1 and F2 are in the nature of curling in a width direction TD (a direction which is orthogonal to a longitudinal direction MD), it is preferable that tension means (such as a nip roller) for applying a tension is installed in both ends of the sheet materials F1 and F2 while holding the cutting means 100 therebetween. Further, the cutting means 100 is provided with clamp means 114 for clamping the surfaces of the sheet materials F1 and F2 at a time of cutting, and the clamp means 114 installed in both sides of the round blade 110 hold down the surfaces of the sheet materials F1 and F2 at a time of cutting, and suppress the floating of the sheet materials F1 and F2 at a time of cutting, as shown in FIG. 9(b). Further, the sheet materials F1 and F2 are cut by horizontally moving the round blade 110 along the width direction TD of the sheet materials F1 and F2.

(Other Embodiments of Bonding Method Using Turning)

Figure 3B:
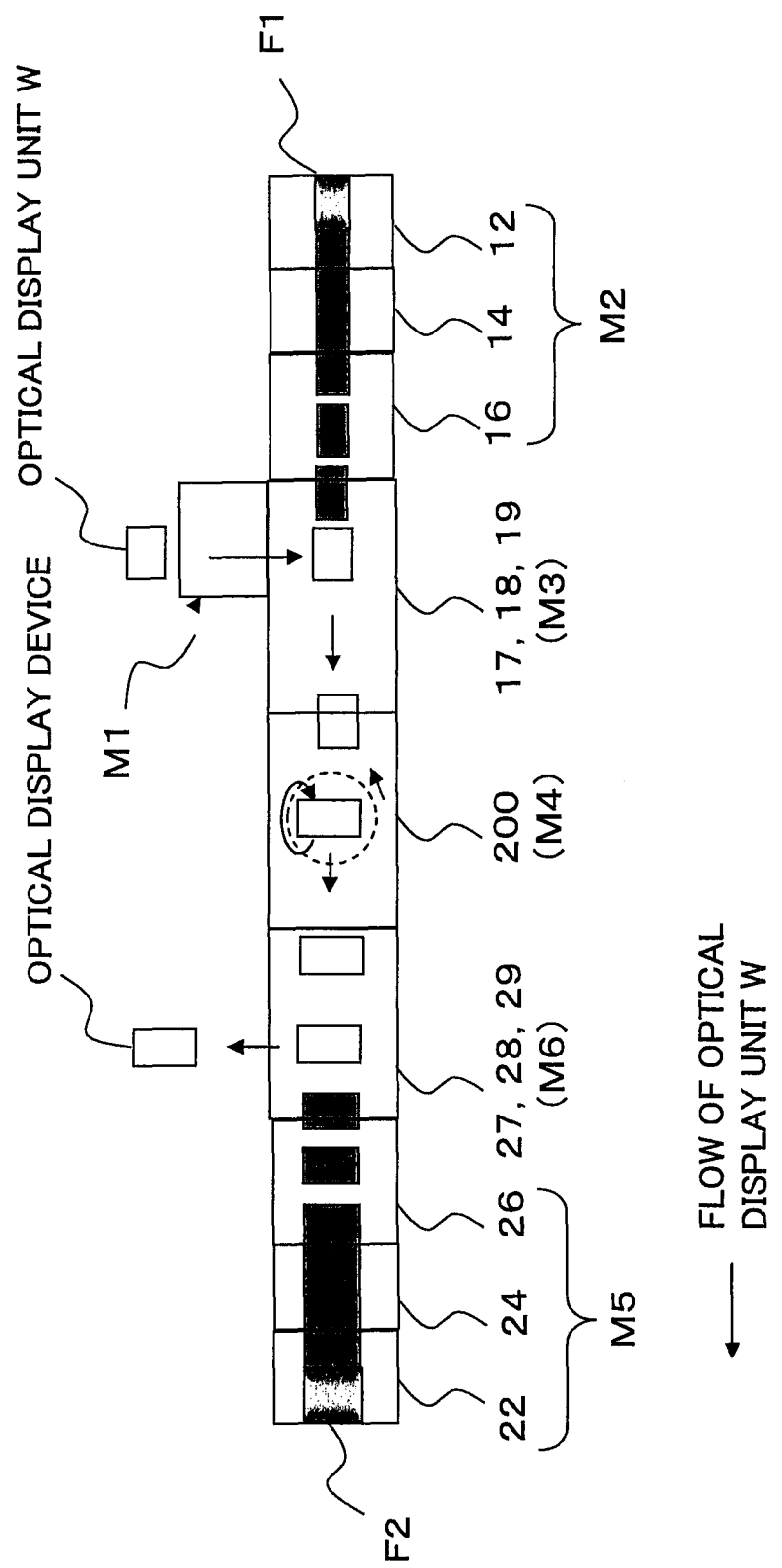
FIG. 3B is a diagram for illustrating another example of the manufacturing system of the invention.

Any one of the turning mechanism 20 and the turning-over mechanism 21 may be arranged in advance, or the structure may be made such that the turning and the turning-over of the optical display unit W are carried out by one mechanism. FIG. 3B is a view for explaining another example of the manufacturing system according to the present invention, and shows the example in which the turning mechanism 20 and the turning-over mechanism 21 are constructed by one mechanism 20. Since the turning-over mechanism 21 is provided, it is possible to both the first optical film F11 and the second optical film F21 from one of the upper side and the lower side with respect to the optical display unit W. In this case, the process may include bonding the first optical film F11 to one surface of the optical display unit W from the upper or lower side, then turning the optical display unit W so that it can be turned over and rotated, and bonding the first optical film F11 to the other surface. For example, the turning may be performed in such a manner that the optical film is turned over and rotated by 90°, which makes it possible to bond the first and second optical films F11 and F21 in a crossed Nicols relationship with each other.

Figure 10:
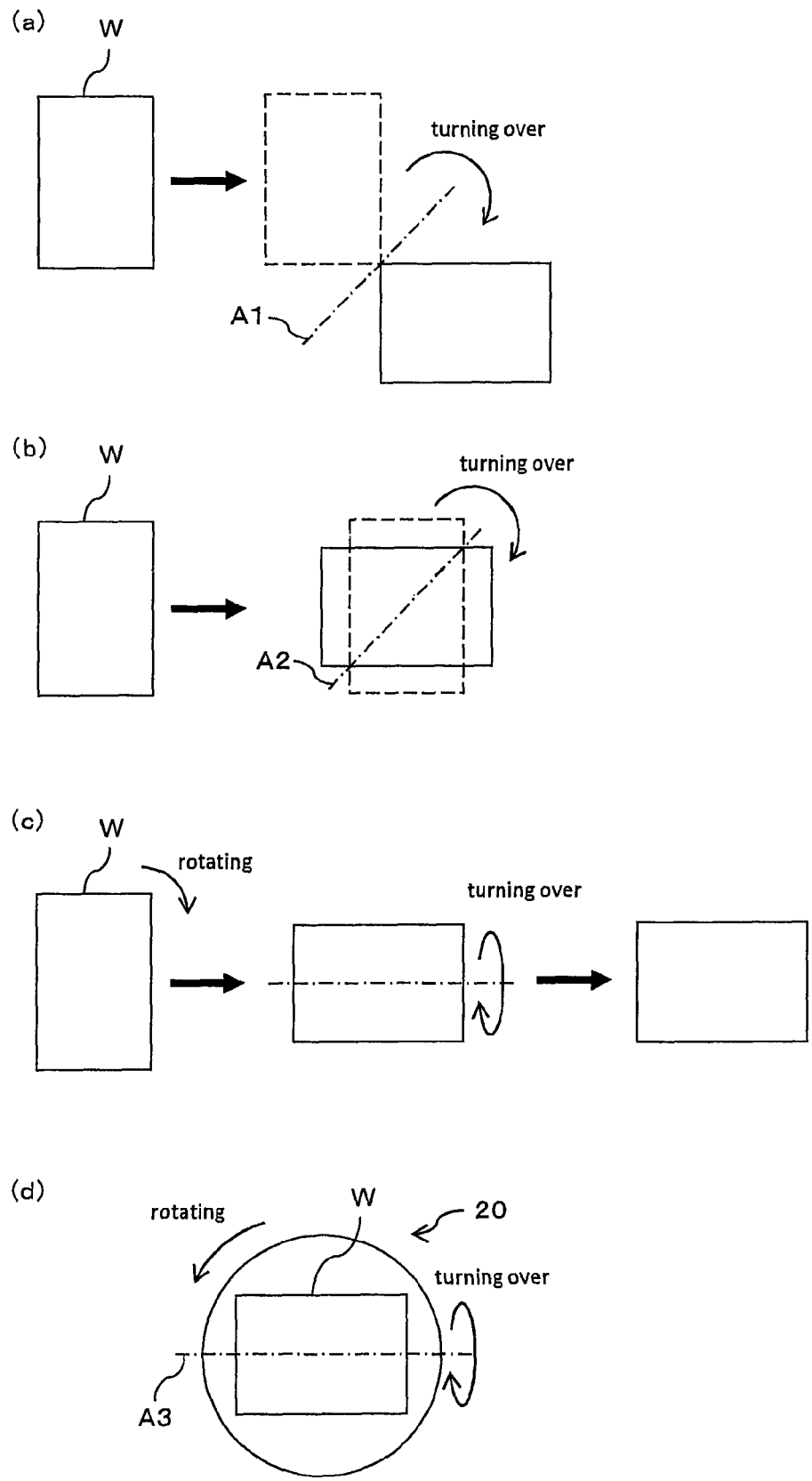
FIG. 10 is a schematic diagram showing a specific example of the method of turning the optical display unit over and by 90°.

FIG. 10 is a schematic diagram showing examples of the method of turning the optical display unit W in such a manner that it is turned over and rotated by 90°. Parts (a) and (b) of FIG. 10 show methods in which the optical display unit W is turned over so as to have a 90° relationship. Part (a) shows an example where the optical display unit W is turned over around a horizontal rotation axis A1 passing through a corner of the optical display unit W, and part (b) shows an example where the optical display unit W is turned over around a horizontal rotation axis A2 passing through the center of the optical display unit W. Part (c) of FIG. 10 shows a method in which turning over and rotation are performed in two stages so that a 90° relationship can be achieved, wherein the turning over and the rotating may be performed in any order. Part (d) of FIG. 10 shows a method in which rotation is performed to achieve a 90° relationship, while turning over is performed, using a turning mechanism 20 including a mechanism for rotating the optical display unit W in a horizontal plane and a mechanism for turning over the optical display unit W around a horizontal rotation axis A3.

The terms "rotated by 90°" and "a 90° relationship" mean a state or relationship where the long side of the optical display unit W after the turning is parallel to the short side before the turning and the short side of the optical display unit W after the turning is parallel to the long side before the turning. It will be understood that the method of turning the optical display unit W is not limited to the modes shown in FIG. 10 and the optical display unit W may be turned over and rotated by 90° in any other mode.

In the embodiment described above, after bonded in the first bonding apparatus 18, the optical display unit W is turned to the bonding direction in the second bonding apparatus 28. Alternatively, as stated above, the second optical film F21 may be bonded to the optical display unit W prior to the first optical film F11. In this case, the optical display unit W after the bonding in the second bonding apparatus 28 may be turned to the bonding direction in the first bonding apparatus 18.

Further, the turning mechanism 20 may be structured such as to turn the piece of first sheet material F1 or the piece of second sheet material F2 after being cut in the bonding direction of the first bonding apparatus 18 or the second bonding apparatus 28, in place of turning the optical display unit W. For example, the piece of first sheet material F1 after being cut may be set to a crossed nicols relation to the second sheet material F2 which is bonded without being turned, by being turned so as to be bonded to the optical display unit W, or the piece of second sheet material F2 after being cut may be set to a crossed nicols relation to the first sheet material F1 which is bonded without being turned, by being turned so as to be bonded to the optical display unit W. Even in this case, any one of the first optical film F11 and the second optical film F21 may be bonded to the optical display unit W in advance.

(Other Embodiments of Manufacturing System)

In one embodiment, the manufacturing system according to the present invention has a first reserving mechanism sequentially reserving the pieces of first sheet materials until the first cutting and bonding apparatus cuts the pieces of first sheet materials from the first long sheet material so as to bond to the optical display unit. In the first cutting and bonding apparatus, in the case that the cutting speed of the first cutting apparatus is higher than the bonding speed of the first bonding apparatus, the excess first sheet materials may be manufactured. In the case as mentioned above, since the first cutting and bonding apparatus has the first reserving mechanism, it is possible to regulate the supply amount of the first sheet materials to be supplied to the bonding apparatus. It is preferable that the manufacturing system according to the present invention has a second reserving mechanism in the same manner in the second cutting and bonding apparatus.

Any arrangement may be employed for an arrangement of each of the apparatuses of the manufacturing system in accordance with the present invention, for example, the feeder M1 of the optical display unit W, the feeder M2 of the first sheet material F1, and the first bonding apparatus M3 may be arranged linearly, the feeder M5 of the second sheet material F2 and the second bonding apparatus M6 may be arranged in parallel thereto, and the feeder M4 may be arranged so as to be provided between the first bonding apparatus M3 and the second bonding apparatus M6.

In the present invention, in the case that the turning mechanism of the optical display unit W is not provided, it is preferable that the feeder M2 of the first sheet material F1 and the first bonding apparatus M3 are arranged vertically to the feeder M5 of the second sheet material F2 and the second bonding apparatus M6.

DESCRIPTION OF THE SYMBOLS

F1 first sheet material
F2 second sheet material
F11 first optical film
F11a first polarizer
F11b first film
F11c second film
F12 first release film
F13 surface protecting film
F14 first pressure-sensitive adhesive layer
F21 second optical film
F21a second polarizer
F21b third film
F21c fourth film
F22 second release film
F23 surface protecting film
F24 second pressure-sensitive adhesive layer
M1 feeder of optical display unit
M2 feeder of first sheet material
M3 first bonding apparatus
M4 feeder
M5 feeder of second sheet material
M6 second bonding apparatus
1 controller
12 first feeder
13 first pre-inspection peeling apparatus
14 first defect inspection apparatus
15 first release film laminating apparatus
16 first cutting apparatus
17 first peeling apparatus
18 first bonding apparatus
19 first rejection apparatus
20 turning mechanism
21 turning-over apparatus
22 second feeder
23 second pre-inspection peeling apparatus
24 second defect inspection apparatus
25 second release film laminating apparatus
26 second cutting apparatus
27 second peeling apparatus
28 second bonding apparatus
29 second rejection apparatus
R feeding mechanism
W optical display unit

The invention claimed is:

1. A manufacturing system of an optical display device comprising a rectangular optical display unit, a first optical film bonded to one surface of the optical display unit and having a first polarizing plate, and a second optical film bonded to the other surface of the optical display unit and having a second polarizing plate, the manufacturing system comprising:
a first material roll of a first long sheet material, the first long sheet material including the first optical film having the first polarizing plate and having a width corresponding to a short side of the optical display unit and having a longitudinal direction parallel to an absorption axis of the first polarizing plate;
a first cutting and bonding apparatus for drawing the first long sheet material from the first material roll of the first long sheet material, cutting the first long sheet material into a length corresponding to a long side of the optical display unit, and thereafter bonding the first optical film in the pieces of cut first sheet materials to one surface of the optical display unit;
a second material roll of a second long sheet material, the second long sheet material including the second optical film having the second polarizing plate and having a width corresponding to a long side of the optical display unit and having a longitudinal direction parallel to an absorption axis of the second polarizing plate;
a second cutting and bonding apparatus for drawing the second long sheet material from the second material roll of the second long sheet material wound, cutting the second long sheet material into a length corresponding to a short side of the optical display unit, and thereafter bonding the second optical film in the pieces of cut second sheet materials to the other surface of the optical display unit;
a feeder for transporting and feeding the optical display unit from any one cutting and bonding apparatus of the first cutting and bonding apparatus and the second cutting and bonding apparatus to the other cutting and bonding apparatus,
wherein the feeder includes a turning mechanism for turning the optical display unit from a bonding direction of any one cutting and bonding apparatus of the first cutting and bonding apparatus and the second cutting and bonding apparatus to a bonding direction of the other cutting and bonding apparatus,
wherein a line direction of the first optical film is in parallel to a line direction of the second optical film,
wherein the first cutting and bonding apparatus has a feeding mechanism for feeding the piece of the cut first sheet material; and
wherein the second cutting and bonding apparatus has a feeding mechanism for feeding the piece of the cut second sheet material.

2. The manufacturing system of an optical display device according to claim 1, wherein the turning mechanism turns over the optical display unit in such a manner that the long side of the optical display unit after being turned becomes in parallel to the short side before being turned, and the short side of the optical display unit after being turned becomes in parallel to the long side before being turned.

3. The manufacturing system of an optical display device according to claim 2, wherein the first cutting and bonding apparatus, the feeder, and the second cutting and bonding apparatus are arranged linearly.

4. The manufacturing system of an optical display device according to claim 1, wherein the feeder includes a turning-over mechanism for turning over the optical display unit.

5. The manufacturing system of an optical display device according to claim 1, wherein the first cutting and bonding apparatus, the feeder, and the second cutting and bonding apparatus are arranged linearly.

6. The manufacturing system of an optical display device according to claim 1, wherein each of the first cutting and bonding apparatus and the second cutting and bonding apparatus has cutting means for cutting the long sheet material by horizontally moving in a width direction of the long sheet material.

7. The manufacturing system of an optical display device according to claim 1, wherein each of the first cutting and bonding apparatus and the second cutting and bonding apparatus has a rejection mechanism cutting and rejecting a portion having a defect in the long sheet material.

* * * * *